United States Patent
Byun et al.

(10) Patent No.: US 10,383,105 B2
(45) Date of Patent: Aug. 13, 2019

(54) METHOD AND DEVICE FOR TRANSMITTING CONTROL INFORMATION IN WIRELESS COMMUNICATION SYSTEM

(71) Applicant: LG ELECTRONICS INC., Seoul (KR)

(72) Inventors: Ilmu Byun, Seoul (KR); Heejeong Cho, Seoul (KR); Genebeck Hahn, Seoul (KR); Eunjong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 15/738,050

(22) PCT Filed: Dec. 9, 2015

(86) PCT No.: PCT/KR2015/013415
§ 371 (c)(1),
(2) Date: Dec. 19, 2017

(87) PCT Pub. No.: WO2017/010633
PCT Pub. Date: Jan. 19, 2017

(65) Prior Publication Data
US 2018/0310280 A1    Oct. 25, 2018

Related U.S. Application Data

(60) Provisional application No. 62/191,474, filed on Jul. 12, 2015.

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04W 72/044* (2013.01); *H04W 72/0493* (2013.01)

(58) Field of Classification Search
CPC ............ H04W 72/02; H04W 72/0406; H04W 72/042; H04W 72/044; H04W 72/0493; H04L 5/003; H04L 5/0053
See application file for complete search history.

(56) References Cited

U.S. PATENT DOCUMENTS 9,706,535 B2 * 7/2017 Yang ................... H04L 5/0023
2012/0269152 A1   10/2012 Hong et al.
(Continued)

FOREIGN PATENT DOCUMENTS

EP       1 892 866 A1    2/2008

OTHER PUBLICATIONS

Huawei et al., "Motivation of New SI Proposal Latency Reduction", RP-150238, 3GPP TSG RAN Meeting #67, Shanghai, China, Mar. 9-12, 2015, pp. 3-9.

*Primary Examiner* — Robert C Scheibel
(74) *Attorney, Agent, or Firm* — Dentons US LLP

(57) ABSTRACT

Provided are a method and device for transmitting control information in a wireless communication system. In particular, a downlink resource block group including a downlink resource block in a downlink frequency bandwidth is set, and an uplink resource block group including an uplink resource block in an uplink frequency bandwidth is set. If the downlink frequency bandwidth is smaller than the uplink frequency bandwidth, the downlink resource block group is mapped to the uplink resource block group. The ratio of the number of uplink resource blocks to the number of downlink resource blocks is set so that the number of uplink resource block groups and the number of downlink resource block groups become the same. The uplink and downlink resource block groups are mapped according to the ratio. Control information on the mapping is transmitted through the downlink resource block groups.

12 Claims, 16 Drawing Sheets

-------- Mapping

(56) References Cited

U.S. PATENT DOCUMENTS

| | | | |
|---|---|---|---|
| 2014/0071954 A1 | 3/2014 | Au et al. | |
| 2014/0321286 A1 | 10/2014 | Yavuz et al. | |
| 2016/0143008 A1* | 5/2016 | Lee .................... | H04W 72/042 370/336 |
| 2017/0310429 A1* | 10/2017 | Wang .................... | H04L 1/1854 |
| 2018/0359745 A1* | 12/2018 | Yeo .......................... | H04L 1/18 |

* cited by examiner

METHOD AND DEVICE FOR TRANSMITTING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2015/013415, filed on Dec. 9, 2015, which claims the benefit of U.S. Provisional Application No. 62/191,474 filed on Jul. 12, 2015, the contents of which are all hereby incorporated by reference herein in their entirety.

BACKGROUND OF THE INVENTION

Field of the Invention

The present specification relates to wireless communication, and more particularly, to a method of transmitting control information in a wireless communication system, and a device using the method.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, the time taken for control information or data user to be transmitted on a single subframe is a transmission time interval (TTI). In general, the length of a single subframe is 1 ms. However, a next-generation wireless communication system for responding to a change of a higher data rate and a faster channel environment attempts to achieve latency of 1 ms on a user plane. That is, a TTI having a length of 1 ms has a structure not suitable for low latency requirements in a next-generation wireless communication system. Accordingly, there is a need for a method for disposing a radio resource structure for satisfying lower latency by controlling a short TTI subdivided from the existing TTI.

SUMMARY OF THE INVENTION

The present invention provides a method of transmitting control information in a wireless communication system, and a device using the method.

The present specification proposes a method of transmitting control information in a wireless communication system.

First, terminologies are summarized. A subframe is transmitted in unit of a transmission time interval (TTI), and a downlink resource block (RB) and an uplink RB are transmitted in unit of a short TTI (sTTI) which is set temporally shorter than the TTI. That is, the downlink RB may be a short RB (sRB), and a downlink resource block group (RBG) may be a downlink short RBG (sRBG). In addition, the uplink RB may be an uplink sRB, and the uplink RBG may be a sRBG. Herein, it is assumed that the downlink RBG includes at least 4 downlink RBs to achieve a low latency of 1 ms.

First, the downlink RBG including the downlink RB in the downlink frequency band is set. That is, the downlink sRB may be grouped to set the downlink sRBG. In addition, the downlink sRBG may include a downlink sRB sub-group (sRBSG). The downlink sRBSG is used so that UEs to which the same downlink sRBG is assigned are multiplexed in the downlink sRBG.

The uplink RBG including the uplink RB in the uplink frequency band is set. That is, the uplink sRB may be grouped to set the uplink sRBG. In addition, the uplink sRBG may include an uplink sRB sub-group (sRBSG). The uplink sRBSG is used so that UEs to which the same uplink sRBG is assigned are multiplexed in the uplink sRBG.

If the downlink frequency band is smaller than the uplink frequency band, the downlink RBG is mapped to the uplink RBG. When it is said that the downlink frequency band is smaller than the uplink frequency band, it means that the total number of downlink sRBs assigned to the UE is less than the total number of uplink sRBs. Mapping will be described in detail. First, a ratio of the number of uplink RBs and the number of downlink RBs is set so that the number of uplink RBGs is equal to the number of downlink RBGs. The uplink RBG and the downlink RBG are mapped according to the ratio. That is, it is set such that a ratio of the number of sRBs in a specific downlink sRBG and the total number of downlink sRBs is equal to a ratio of the number of sRBs in a specific uplink sRBG to be mapped and the total number of uplink sRBs. Finally, a start RB index of the uplink RBG is mapped to a start RB index of the downlink RBG.

Since a ratio is set for the number of uplink RBs and the number of downlink RBs, the number of uplink RBs in the uplink RBG changes linearly depending on the number of downlink RBs in the downlink RBG. In addition, the downlink RBG includes a downlink RBSG. The number of downlink RBs in the downlink RBSG changes depending on the number of downlink RBs in the downlink RBG. In addition, the downlink RBG includes assignment information regarding the downlink RBSG and a UE-identification (ID) indicating a UE for each downlink RBSG. The UE-ID is indicated by a smaller number of bits between the number of bits indicated by a bitmap and the number of bits indicated by a direct indication.

If the downlink frequency band is greater than or equal to the uplink frequency band, the downlink RBG is mapped to the uplink RBG. In this case, the downlink RBG is mapped to the uplink RBG sequentially in a descending order of the number of downlink RBs in the downlink RBG. The number of uplink RBs in the uplink RBG first mapped to the downlink RBG is set to be equal to the number of downlink RBs in the downlink RBG. That is, the downlink RBG having the greatest number of downlink RBs is mapped to the uplink RBG having the same number of uplink RBs as the greatest number of downlink RBs. In addition, the start RB index of the uplink RBG is mapped to the start RB index of the downlink RBG.

On the other hand, the number of uplink RBs in the downlink RBG and the uplink RBG to be mapped next may be set to be less than or equal to the number of downlink RBs in the downlink RBG. If the downlink frequency band is greater than the uplink frequency band, the number of downlink RBs may be greater than the number of uplink RBs. Therefore, the number of downlink RBs may not be equal to the number of uplink RBs from an uplink RBG to be mapped next in an uplink RBG to be mapped first. However, even if the numbers are not identical, since a start RB index of the uplink RBG is mapped to a start RB index of the downlink RBG, the downlink RB and the uplink RB are mapped to each other. However, if there is no uplink RB from the uplink RBG to be mapped next, a downlink RBG corresponding thereto may not be able to be mapped to any uplink RBG.

After a previous mapping process, control information for the mapping is transmitted through the downlink RBG. The control information for the mapping indicates the uplink RBG mapped to the downlink RBG through information regarding a start RB index of the downlink RBG. That is, the control information for the mapping is not for directly scheduling the uplink RBG with a UL grant included in the control information but for indicating a position of the uplink RBG through the downlink RBG simply through the mapping process. This is because the start RB index of the downlink RBG is mapped to the start RB index of the uplink RBG.

In addition, the control information for the mapping further includes one cyclic redundancy checking (CRC) field masked by using a radio network temporary identifier (RNTI) mapped to the downlink RBG and the uplink RBG. That is, a UE assigned to the downlink RBG and a UE assigned to the uplink RBG commonly use one RNTI instead of using respective RNTIs. Herein, the RNTI may be a cell-radio network temporary identifier (C-RNTI).

In addition, the present specification proposes a wireless device for transmitting control information in a wireless communication system.

First, terminologies are summarized. A subframe is transmitted in unit of a transmission time interval (TTI), and a downlink resource block (RB) and an uplink RB are transmitted in unit of a short TTI (sTTI) which is set temporally shorter than the TTI. That is, the downlink RB may be a short RB (sRB), and a downlink resource block group (RBG) may be a downlink short RBG (sRBG). In addition, the uplink RB may be an uplink sRB, and the uplink RBG may be a sRBG. Herein, it is assumed that the downlink RBG includes at least 4 downlink RBs to achieve a low latency of 1 ms.

The wireless device includes a radio frequency (RF) unit for transmitting and receiving a radio signal and a processor coupled to the RF unit. The processor first sets the downlink RBG including the downlink RB in the downlink frequency band. In addition, the processor sets the uplink RBG including the uplink RB in the uplink frequency band. If the downlink frequency band is smaller than the uplink frequency band, the downlink RBG is mapped to the uplink RBG. Specifically, a ratio of the number of uplink RBs and the number of downlink RBs is set so that the number of uplink RBGs is equal to the number of downlink RBGs. The uplink RBG and the downlink RBG are mapped according to the ratio. After being mapped, control information for the mapping is transmitted through the downlink RBG.

A transfer rate of a system can be enhanced by using a resource assignment method, an MCS transmission method, and a downlink synchronization retransmission method to decrease an overhead of a physical control signal. In addition, since transmission can be performed by using a sTTI in at least 4 RBs, low-latency transmission is also possible in an LTE system having a system band of 1.4 MHz. In addition, since the sTTI is assigned based on a multiple of the existing scheduling unit, efficiency of scheduling can be increased.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
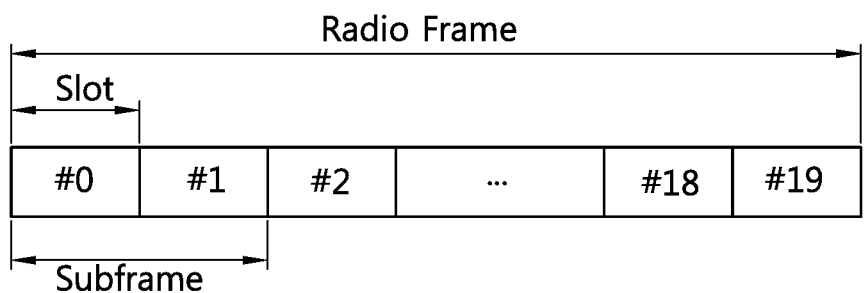
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
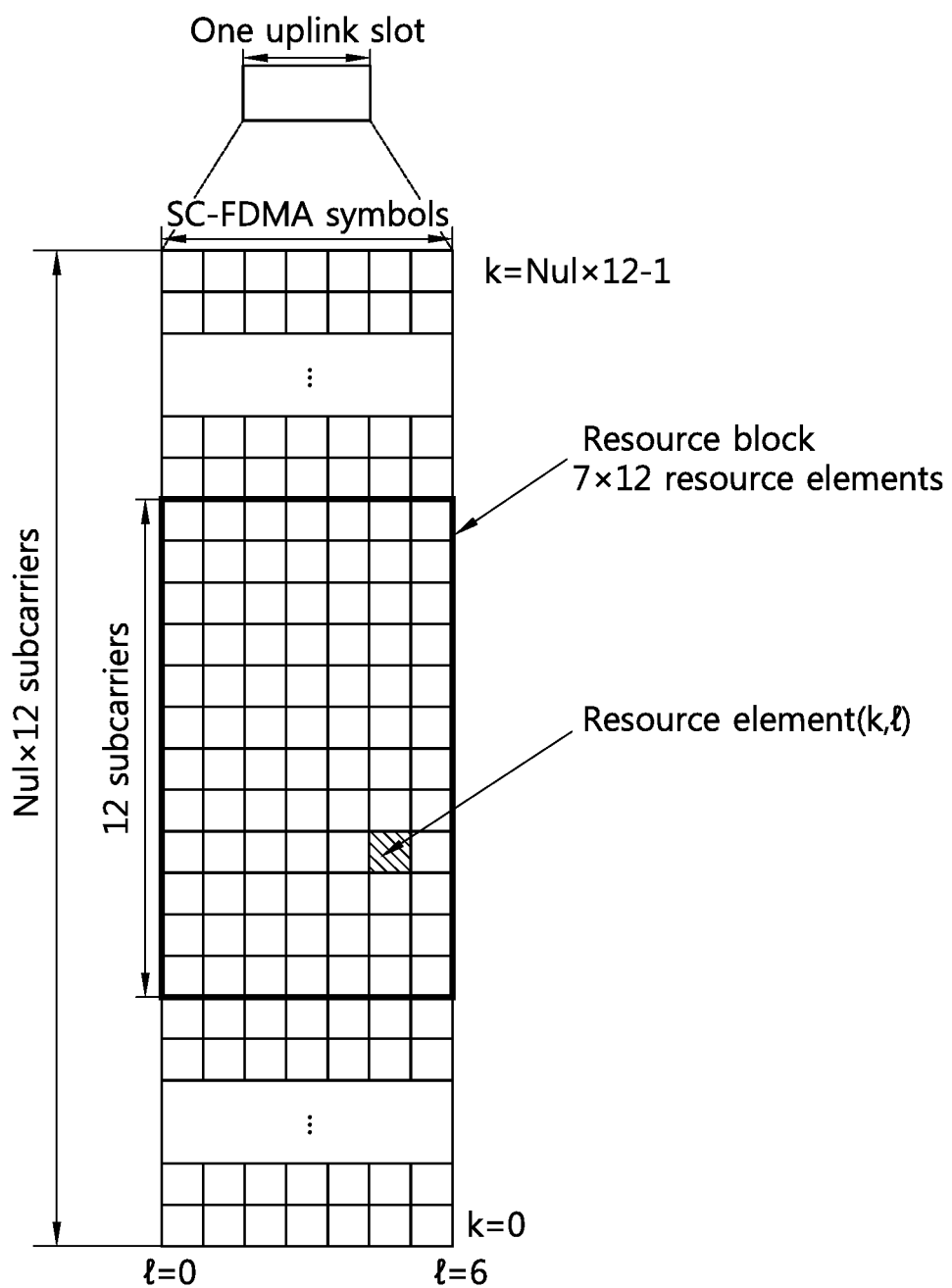
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k(k=0, ..., $N^{UL}$×12−1) denotes a subcarrier index in the frequency domain, and l(l=0, ..., 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
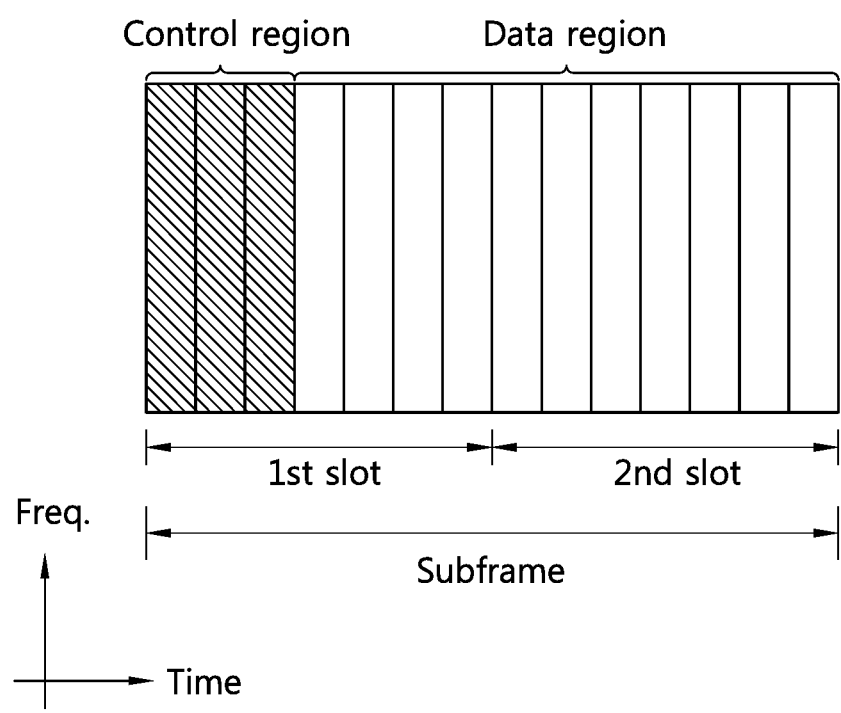
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

Hereinafter, a subframe consisting of N (>=1) OFDM symbols is defined, and a specific radio frame structure in which M (>=0) subframes and P (>=0) special symbols (s-symbols) for a control physical signal or a control information transport channel are bundled is described. This shows a specific radio frame structure designed differently from the example in which 14 contiguous OFDM symbols illustrated in FIG. 1 become one subframe and 10 subframes have one radio frame structure.

Data, a control physical signal, and control information may be transmitted in a subframe, and a control physical signal and control information other than data may be transmitted in a special symbol. Such a time section resource transmission structure may be designated in a UE unit or may be designated so that it is in common applied to all of pieces of UE in a cell or system. At the same time, a transmission structure may be limitedly designated so that it is applied depending on a time or frequency band (subband). If the time section resource transmission structure is designated in a UE unit, UE may be notified of such designation using a UE-specific downlink physical control channel or UE-specific RRC signaling. In the case of the UE-common designation of a BS or network, UE may be notified of the designation using a UE-common downlink physical control channel or UE-common RRC signaling as system information.

Figure 4:
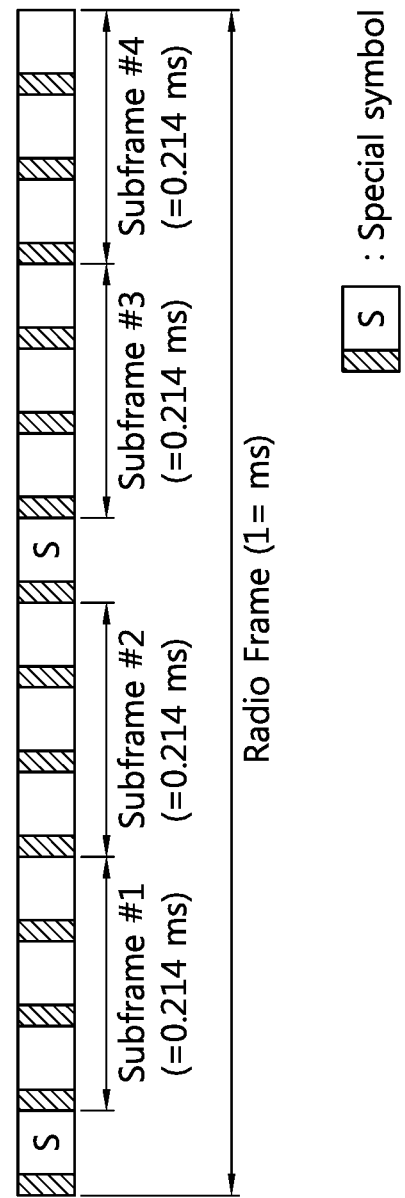
FIG. 4 shows the structure of a radio frame including subframes and special symbols.

FIG. 4 shows the structure of a radio frame including subframes and special symbols.

FIG. 4 illustrates a time section transmission resource structure in which three OFDM symbols (N=3) form a single subframe and four subframes (M=4) and two special symbols (P=2) define a radio frame of 1 ms in length. The length of each subframe is 0.214 ms.

In this case, special symbols within the radio frame may be disposed at equal distances, may be disposed only at a specific location, or may be irregularly disposed. If the role of special symbols is for measurement, detection or the transfer of information, the special symbols may be disposed at equal distances. Special symbols may be irregularly disposed depending on the number of pieces of UE within a cell or a channel characteristic. Some examples in which a special symbol is disposed are described below.

Figure 5:
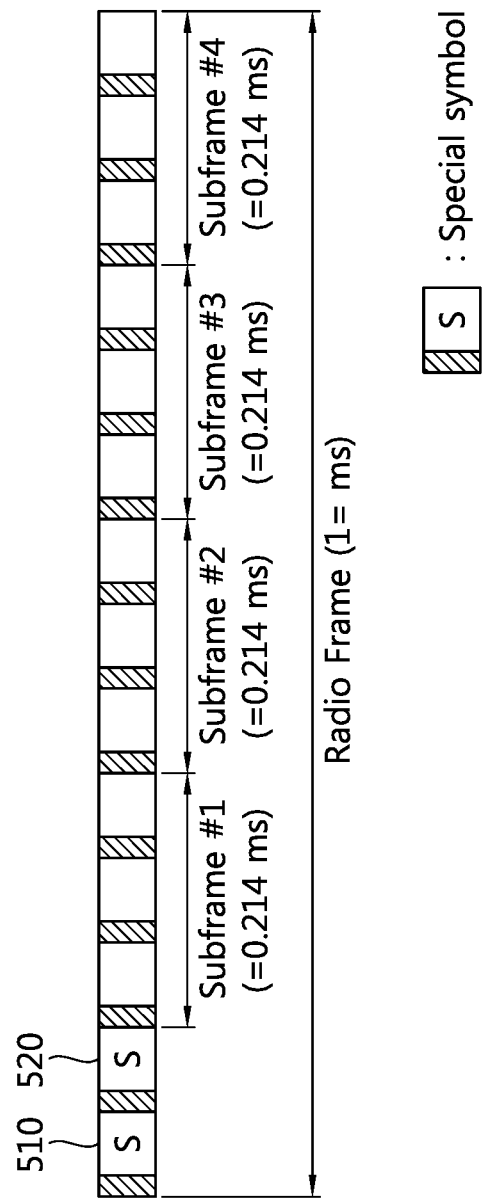
FIG. 5 shows an example of the structure of a radio frame in which special symbols have been contiguously disposed at the front part of the radio frame.
Figure 6:
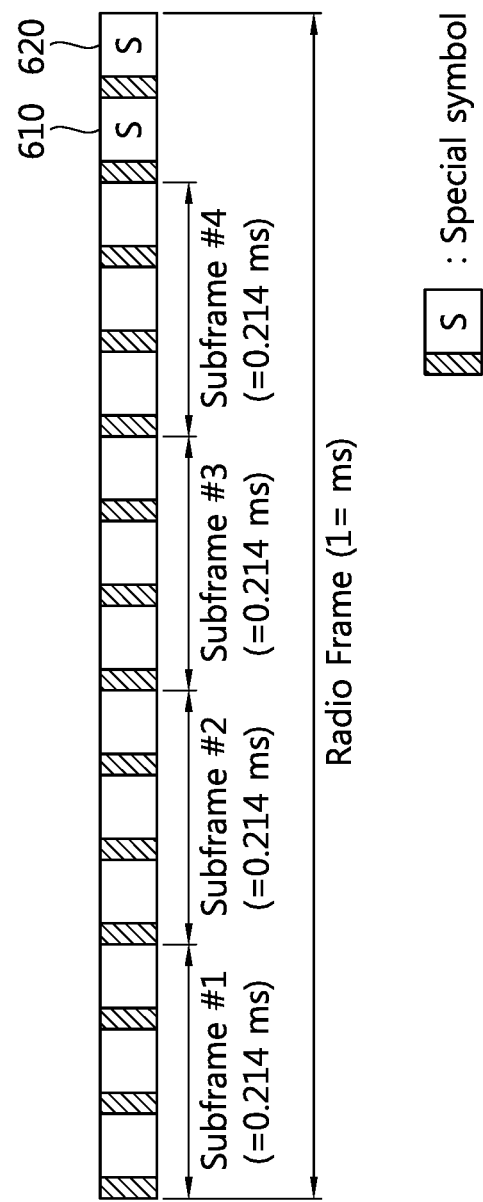
FIG. 6 shows an example of the structure of a radio frame in which special symbols have been contiguously disposed at the back part of the radio frame.

FIG. 5 shows an example of the structure of a radio frame in which special symbols have been contiguously disposed at the front part of the radio frame. FIG. 6 shows an example of the structure of a radio frame in which special symbols have been contiguously disposed at the back part of the radio frame. FIG. 5 shows a transmission resource structure in which special symbols 510 and 520 are contiguously disposed in symbols that are temporally the first two on the radio frame. FIG. 6 shows a transmission resource structure in which special symbols are contiguously disposed in symbols 610 and 620 that are temporally the last two on the radio frame.

In this specification, in the time section transmission resource structure, the locations of special symbols in each radio frame may be different in a radio frame unit or a plurality of radio frame units. If one or a plurality of special symbol is periodically disposed in a radio frame unit, the locations of special symbol in a corresponding cycle may be patterned, and an index may be assigned to the pattern. Alternatively, a BS may notify UE of control information about a bitmap form in a radio frame unit through RRC signaling, may transfer the control information to the UE through a downlink physical data channel using an MAC control element (CE), or may transfer the control information to the UE through a downlink physical control channel.

In this specification, the time section transmission resource structure is specified in a UE unit in frequency division duplex (FDD). Alternatively, the time section transmission resource structure may be applied to both a downlink transmission band and an uplink transmission band or only one of a downlink transmission band and an uplink transmission band with respect to all of pieces of UE within a cell.

Likewise, the time section transmission resource structure may be specified in a UE unit in time division duplex (TDD) or full duplex using specific radio resources for uplink/downlink transmission. Alternatively, the time section transmission resource structure may be applied to both downlink transmission time resources and uplink transmission time resources or only one of downlink transmission time resources and uplink transmission time resources with respect to all of pieces of UE within a cell. From a viewpoint of an uplink/downlink time section resource configuration of TDD, a method for designating downlink transmission resources and uplink transmission resources in a radio frame unit may be applied to the time section transmission resource structure. Alternatively, a method for designating downlink transmission resources and uplink transmission resources in a subframe unit within a radio frame may be applied to the time section transmission resource structure.

That is, in this specification, the time section transmission resource structure is provided on the basis that it may be independently applied to uplink/downlink transmission resources using parameters independently on a physical control channel or RRC signaling. Furthermore, if only a method for simultaneously applying uplink transmission and downlink transmission is used depending on a method for applying a system, the time section transmission resource structure may be applied in common simultaneously using a single parameter on a physical control channel or RRC signaling.

In this specification, the time section transmission resource structure defines a special symbol within a radio frame independently of a subframe. In this case, the special symbol may be used to transmit special cell-common or UE-specific control information. Furthermore, the special symbol may be used to transmit a special cell-common or UE-specific physical signal (e.g., a pilot, a reference signal or a synchronization signal) for the purpose of the measurement or detection of UE. Possible examples of a signal or control information that is transmitted in the special symbol are described below in the case of downlink and uplink.

1. Downlink (1) Transmission of Physical Downlink Control Channel (PDCCH)

A BS transmits a PDCCH, including UE-common control information or pieces of UE-specific control information required to be transmitted from the BS or a specific network radio node to UE through downlink, to the UE through a special symbol. The UE may receive a physical channel, that is, the object of the special symbol. In this case, the PDCCH is basically designed on a frequency resource on a single special symbol, but may be designed on a plurality of symbols resources and frequency resources if a plurality of special symbols is used.

(2) Transmission of Downlink Synchronization Signal

A BS may transmit a downlink synchronization physical signal transmitted so as to obtain the downlink reception synchronization of UE through one or more special symbols. For example, in 3GPP LTE, a primary synchronization signal (PSS) and a secondary synchronization signal (SSS) become the object of a downlink synchronization physical signal. If such a method is applied, the location of a special symbol used to the corresponding object within a specific defined radio frame on time section resources may be designated in a UE-common manner. Furthermore, a BS and UE permanently designate the location of a special symbol without separate signaling.

(3) Transmission of Downlink Channel Measurement Pilot (or Reference Signal)

For the purpose of system downlink control including the support of a determination of the time-frequency resource configuration and transmission method of a packet scheduler adaptive to a radio channel on a radio packet transmission system, a downlink channel measurement pilot is transmitted through one or more special symbols defined separately from a UE data channel transmission time section. Furthermore, UE performs radio channel measurement using a corresponding pilot through a corresponding special symbol. This method may be used as a method for preventing the deterioration of data transmission performance generated because resources for transmitting the existing data channel are excessively used to transmit a pilot signal if a technology in which downlink transmission is performed using a large number of transmission antennas, such as massive MIMO, is used in a mobile communication system. In this case, the massive MIMO may be defined as a transmission method using 16 or more transmission antennas. It is assumed that a downlink channel measurement pilot is transmitted using a plurality of special symbols. In this case, in addition to the multiplexing method of a multiple pilot resource pattern using a basic TDM, FDM method, the multiplexing method of a multiple pilot resource pattern using a CDM method through the application of time section orthogonal code or frequency section orthogonal code may be applied.

(4) Use of Interference Signal Measurement by UE

An operation of allowing UE to measure a downlink reception interference signal of another network radio node or UE other than a network radio node (or BS) that provides service through one or more special symbols may be defined. As a first example, a specific network radio node (or BS) excludes the transmission of a radio signal in all of subcarrier resources or some designated subcarrier resources included in a special symbol on time section transmission resources that are to be used for transmission by the specific network radio node (or BS). Furthermore, UE that is provided with service from a corresponding network radio node may use a method for receiving a specific signal (it may be defined as a pilot or reference signal) of adjacent network radio nodes (or BSs) through the corresponding symbol. In this case, a special symbol transmission signal on a plurality of network radio nodes may be defined as a pilot (or reference signal) for downlink channel measurement. Furthermore, in order to exclude the transmission of a radio signal, all of subcarrier resources within a specific pilot pattern or a corresponding symbol may be specially defined as a null power pilot. As a second example, an operation for the UE interference measurement of the first example may be applied in a situation in which a serving network radio node also transmits a signal by applying a specific resources pattern of a specific pilot (or reference signal) of a specific channel may also be applied.

(5) Transmission of Downlink ACK/NACK Signal for Uplink Data

A downlink ACK/NACK signal for transmitting uplink data is defined as a physical channel on a specific special symbol. A network radio node (or a BS) that receives the uplink data transmits the downlink ACK/NACK signal through the corresponding special symbol. A correction mechanism operation for detecting an error of a system physical layer may be defined so that UE that transmits the uplink data receives the downlink ACK/NACK signal through the corresponding special symbol.

(6) Transmission of Downlink Massive MIMO Beam Scanning Signal

In this specification, a radio network node (or a BS) adopting a time section transmission resource structure also applies a downlink transmission method of massive MIMO. In this case, an operation for transmitting, by a network radio node (or a BS), the transmission of a signature, pilot or reference signal for supporting the UE beam tracking of massive MIMO in a specific cycle through a special symbol and receiving, by UE, the signature, pilot or reference signal through a corresponding special symbol may be defined as applied.

2. Uplink (1) Transmission of an Uplink Synchronization Signal

A method for designing the uplink synchronization signal (e.g., a physical random access channel (PRACH) preamble in 3GPP LTE) of UE in the length of one or a plurality of special symbols and transmitting the uplink synchronization signal may be applied in a situation in which this time section transmission resource structure is applied as an uplink transmission frame structure.

(2) Transmission of Uplink Channel Sounding Signal

An uplink channel sounding signal of UE may be designated to be transmitted through a special symbol on the time section transmission resource structure. If a network radio node (or a BS) instructs the uplink channel sounding signal to be transmitted, a UE-specific uplink data transmission grant at a specific point of time prior to a corresponding special symbol by a designated length (it may be designated in a radio frame or subframe unit) may be triggered in a PDCCH using in a channel sounding transmission indicator. In some embodiments, a UE-specific uplink data transmission grant may be designated using an RRC parameter and signaled to UE when a periodical channel sounding signal is transmitted. In both the methods, a point of time at which the transmission of a UE-specific channel sounding signal is attempted and a resource configuration may be previously designated using an RRC parameter and signaled to UE.

(3) Transmission of Physical Uplink Control Channel (PUCCH)

In a situation in which the time section transmission resource structure is applied as an uplink transmission frame structure, a method for transmitting uplink control information of specific UE through a PUCCH designed on one or a plurality of special symbols may be applied. In this case, the uplink control information of UE may be defined as follows.

Uplink scheduling request information according to a change of the transmission buffer state of UE (data arrival)

Downlink channel measurement information of UE

ACK/NACK information for the reception of downlink data by UE

The type of uplink physical control channel transmitted through one or a plurality of special symbols may be designated by taking into consideration the requirement information about of the above-described uplink control information, that is, a bit size. The type basically includes the following two schemes.

Scheme #1: A method for defining one PUCCH supporting an error generation restriction condition that is required for each piece of information on a bit size of uplink control information of a wide range and being applied to control information cases in common.

Scheme #2: A method for defining an individual PUCCH (s) supporting a maximum size of control information bit and an error requirement condition of corresponding information for each piece of control information in the case where a difference between the bit size of individual uplink control information and a required error generation rate restriction condition is defined to be large and transmitting the individual PUCCH(s) through one or a plurality of special symbols.

(4) Utilization of Interference Signal Measurement by UE

An operation for allowing a network radio node (or a BS) to measure the uplink reception interference signal of another network radio node or UE through one or more special symbols may be defined. As a detailed example, a plurality of pieces of specific UE or a specific network radio node (or a BS) may be designated to transmit a special pilot (or reference signal or signature), that is, an object of interference measurement, using a special symbol. In this case, the specific radio network node (or the BS) may check a surrounding interference situation by receiving and detecting such signals. In this case, the transmission of a corresponding pilot through special symbols of pieces of UEs that are to be received by the specific network radio node (or the BS) through uplink may be excluded. Furthermore, for such a purpose, all of subcarrier resources within a specific pilot pattern or a corresponding symbol may be specially defined as a null power pilot.

A next generation wireless communication system aims to satisfy a user plane latency of 1 ms in order to provide a lower latency service. The user plane latency includes not only the existing TTI length but also an encoding time and a decoding time. The user plane latency in a 3GPP LTE system is about 4.8 ms (encoding time=decoding time=1.5 ms, the existing TTI length=1 ms, target BLER=10%).

In this case, if a sTTI reduced from the existing TTI has a length of 1 to 3 OFDM symbols, the user plane latency may be achieved as 1 ms. That is, in order to achieve the user plane latency of 1 ms, the sTTI must have a length less than or equal to 3 OFDM symbols. If the user plane latency is less than or equal to 1 ms, the existing TTI must be about 1/4.8=0.21 ms. However, ever since the sTTI has a length of 4 OFDM symbols, the user plane latency cannot be achieved as 1 ms. This is because the sTTI is greater than or equal to 0.28 ms ever since the number of OFDM symbols is 4. Herein, it is assumed that the encoding/decoding time is also decreased proportionally in association with a decreased TTI.

However, since a transmission length of a data channel is decreased in the sTTI, there is a problem in that an overhead of a control signal is increased in general. If a control signal of the existing LTE system is directly utilized, a minimum bandwidth for applying the sTTI is increased due to the overhead of the control signal. In addition, only a small number of UEs can transmit and receive signals simultaneously through the sTTI in a given bandwidth.

For example, in a case where a DCI format 1A is used for downlink transmission in an LTE system having 50 resource blocks (RBs) in a bandwidth of 10 MHz, if scheduling is performed in unit of 3 RBs, 36 bits are required in total. In general, if a ⅓ coding rate and a quadrature phase shift keying (QPSK) modulation scheme are used, 54 resource elements (REs) are required in total for a DL grant. If it is assumed that a data channel of the sTTI has REs twice more than the control channel, 162 REs are required in total (54+54×2=162) in order for one UE to transmit a downlink signal.

Figure 7:
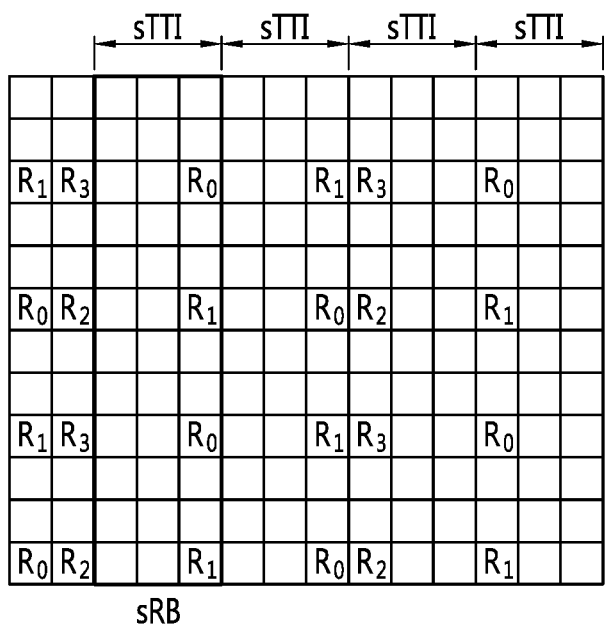
FIG. 7 shows an example of a sTTI structure having 3 OFDM symbols.

FIG. 7 shows an example of a sTTI structure having 3 OFDM symbols.

In FIG. 7, a short RB (sRB) consists of 12 subcarriers and 3 OFDM symbols in total. Although one sRB consists of 36 REs, 32 REs can transmit signals in practice except for a cell-specific reference signal (CRS). In addition, the number of REs capable of transmitting signals in a first symbol of the sTTI is 8 in the presence of the CRS. It is considered a situation where a control signal is arranged only in the first symbol of the sTTI to satisfy a user plane latency of 1 ms in the sTTI structure having 3 OFDM symbols. Then, 7 sRBs are required to transmit one DL grant. This is because at least 54 REs required for the DL grant are secured given that 8×7=56.

A UL grant must also be transmitted in a system in addition to the DL grant. Therefore, about 14 sRBs are required to transmit one DL grant and one UL grant. This implies that only 4 downlink UEs and 4 uplink UEs cannot help simultaneously transmitting control signals in a system having 50 RBs. In addition, an operation of transmitting the control signal may be impossible in a system having 6 RBs or 10 RBs. In this case, the existing UE must perform communication by using 4 RBs during a TTI. Therefore, the control signal needs to be designed to be compact to decrease an overhead of the control signal.

Figure 8:
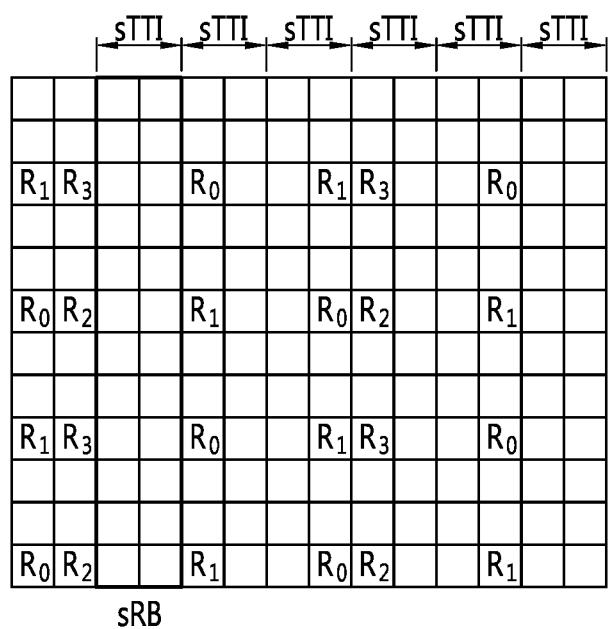
FIG. 8 shows an example of a sTTI structure having 2 OFDM symbols.

FIG. 8 shows an example of a sTTI structure having 2 OFDM symbols.

In the sTTI structure having 2 OFDM symbols, a user plane latency of 1 ms can be achieved even if a control signal is transmitted across the entirety of the sTTI instead of a first OFDM symbol of the sTTI. That is, the control signal can be transmitted as in an enhanced PDCCH (ePDCCH) in an LTE system.

However, if a length of the sTTI is further limited to 2 OFDM symbols, the aforementioned problem becomes more serious. In the sTTI having 2 OFDM symbols, one sRB consists of up to 24 REs and at least 20 REs. Therefore, if an overhead of a control signal is maintained to 33%, one UE requires 9 sRBs to transmit a downlink signal. This is because at least 54 REs required for a DL grant are secured given that 20×0.33×9=59.4. 3 sRBs are also required to transmit an uplink control signal. Therefore, if control signals are arranged in an FDM manner in a sTTI structure having a length of two OFDM symbols, the control signals can be simultaneously transmitted to up to 4 downlink UEs and 4 uplink UEs in a system having 50 RBs. In this case, the existing UE must perform communication by using two RBs.

Therefore, the present specification proposes a method of decreasing an overhead of a control signal. Hereinafter, a method of performing mapping between a downlink resource and an uplink resource to further decrease an overhead of an uplink control signal is described.

Specifically, for a short resource block group (sRBG) including a short resource block (sRB) to which a sTTI is applied and for a short resource block sub-group (sRBSG), a method of arranging a short PDCCH (sPDCCH) in the sRBG and a method of transmitting resource assignment information regarding the sRBSG in the sPDCCH are proposed. In addition, it is proposed a method of mapping a downlink sRBG and an uplink sRBG to decrease an overhead of a physical layer uplink control signal. It is characterized in that one sPDCCH is arranged only in one sRBG and schedules a resource in unit of the sRBSG. In addition, it is proposed a method of arranging a sTTI resource to decrease an overhead of modulation and coding scheme (MCS) information by minimizing a change of an MCS level depending on resource assignment in the sTTI. In addition, it is proposed a method of decreasing a retransmission control signal through a synchronous downlink retransmission method. Finally, an embodiment of sPDCCH signaling is described by applying the aforementioned method.

First, a method of performing mapping between a downlink resource and an uplink resource for effective resource assignment is described below.

In the present specification, a sRBG implies a resource unit to which a sTTI is applicable. In addition, the sRBG may be a basic unit to which the sTTI is applied in the existing band when in-band multiplexing is performed with respect to an LTE system. In case of being used in a dedicated carrier, it may be a scheduling unit for low-latency transmission. It is characterized in that one sPDCCH is located only in one sRBG.

Hereinafter, a method of setting a size of a sRBG is described.

A minimum resource capable of transmitting a sPDCCH must be ensured in a downlink sRBG. An LTE system uses a 16-bit cyclic redundancy check (CRC) for a PDCCH. Since a low-latency transmission method can be used in combination of LTE, it is reasonable to consider a case of applying the 16-bit CRC also in the sPDCCH. In addition, since control channel information must be received reliably in anywhere in a cell, it is assumed that a tail biting convolutional code having a ⅓ coding rate and a QPSK modulation method are used in general. Therefore, resource elements (REs) of (x+16)×3/2 are required to transmit x-bit control information. This implies that at least 24 REs must be assigned for the sPDCCH.

It is assumed in the present specification that a control signal is transmitted only in a first OFDM symbol of a sTTI to ensure a decoding time of the control signal to the maximum extent possible. The number of subcarriers is 12 in an RB of an LTE system, and up to 4 CRSs may be arranged in one OFDM symbol of a single RB. The number of REs that can be assigned for the control signal of the sTTI is at least 8 and up to 12. If the sRBG consists of 3 RBs, at least 24 (8×3) REs are assigned for the control channel. This implies that even 1-bit control signal cannot be transmitted in case of using the 16-bit CRC. If the sRBG consists of 4 RBs, at least 32 (8×4) REs and up to 48 (12×4) REs may be assigned for the control channel Therefore, the sRBG may consist of at least 4 RBs.

In addition, it is preferably designed to perform low-latency communication also in 1.4 MHz which is a minimum transmission band of the LTE system. Since the LTE system having the band of 1.4 MHz has 6 RBs, a minimum value of the sRBG must be less than 6 RBs. Therefore, a minimum size of the sRBG needs to be designed between 4 RBs and 6 RBs.

An RBG which is a scheduling unit of the LTE system varies depending on a system bandwidth. If the system bandwidth is 1.4 MHz, a size of the RBG is 1 RB, and if it is 3 MHz and 5 MHz, the size of the RBG is 2 RBs. In case of 10 MHz, the size of the RBG is 3 RBs, and in case of 15 MHz and 20 MHz, the size of the RBG is 4 RBs. Considering easiness of scheduling for a case of applying the low-latency communication with in-band multiplexing in an LTE system band, it can be known that the scheduling is easy if the sRBG has the same size as the RBG or is a multiple of the RBG. Therefore, the present invention proposes to apply 4 RBs in a minimum unit of the sRBG.

However, the size of the sRBG may be further increased based on 4 RBs. This is because an overhead of a control signal can be decreased if the number of RBs in the sRBG is increased. For example, the size of the sRBG may be set as shown in the following table.

TABLE 1

| | sRBG index | | | | |
|---|---|---|---|---|---|
| | 0 | 1 | 2 | 3 | 4 |
| sRBG size | 4 | 8 | 12 | 16 | 20 |

The size of the sRBG may be set to be equally in a downlink and an uplink, but may also be set differently.

Figure 9:
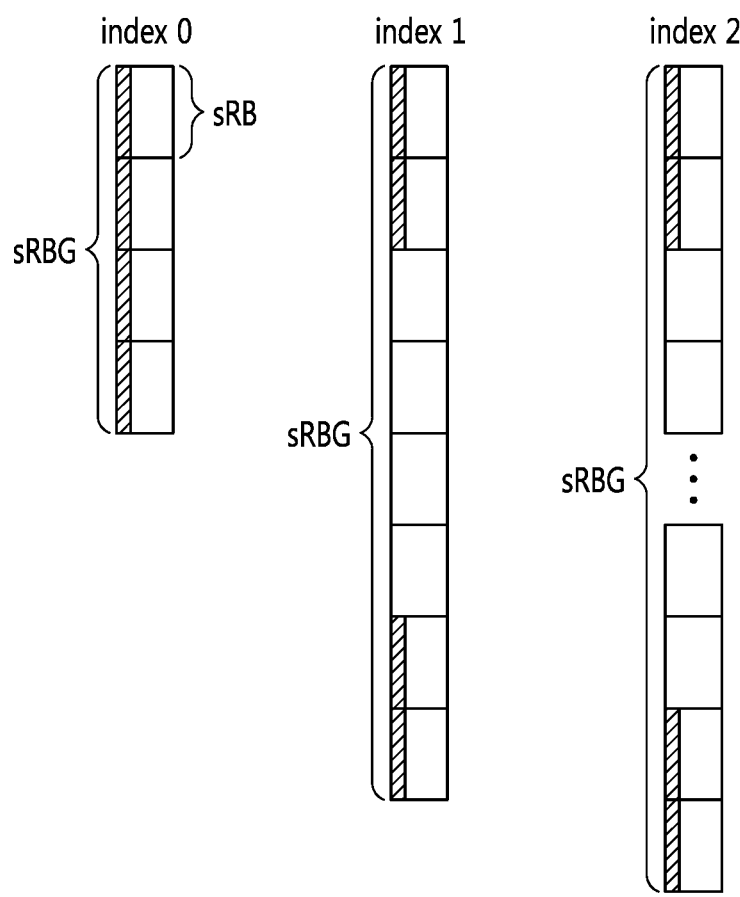
FIG. 9 shows an example of implicitly setting a size of a sRBG according to an arrangement of a sPDCCH.
Figure 10:
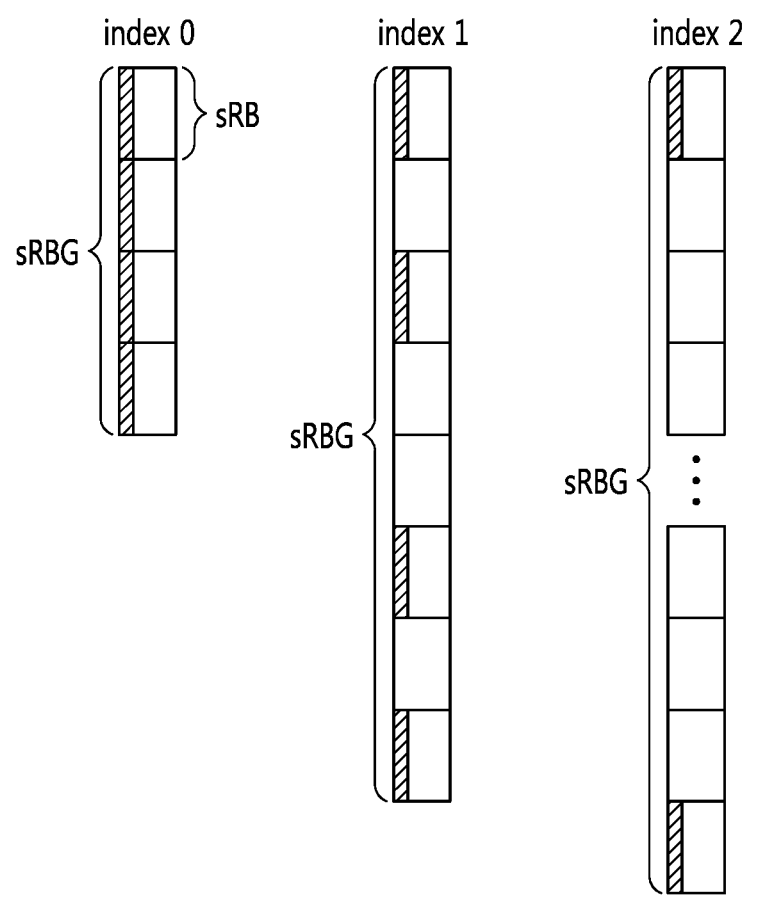
FIG. 10 shows an example of implicitly setting a size of a sRBG according to an arrangement of a sPDCCH.

FIG. 9 and FIG. 10 show an example of implicitly setting a size of a sRBG according to an arrangement of a sPDCCH.

A method of explicitly reporting the size of the sRBG includes a method of designating it through higher layer signaling and a method of designating it through a common physical channel control signal (e.g., a common PDCCH) of the sTTI. Although the higher layer signaling may be radio resource control (RRC) signaling, the present invention is not limited thereto. The size of the sRBG may be designated differently in a band to which the sTTI is applied.

However, as shown in FIG. 9 and FIG. 10, the method of implicitly reporting the size of the sRBG may be a method of reporting the size of the sRBG by varying a resource arrangement of a sPDCCH. That is, the size of the sRBG is reported by arranging a sPDCCH resource to a sRB having first and last logical indices among sRBs in the sRBG. To perform this, each UE must know in advance a position to which the sPDCCH is assigned according to a sRBG index. A position of an RE to which the sPDCCH is assigned must be set differently according to a size of a short CCE constituting the sPDCCH and an aggregation level of the short CCE.

FIG. 9 shows an example of arranging a sPDCCH at both-end sRBs of each sRBG for sRBG indices 0, 1, and 2. FIG. 10 shows an example of arranging a sPDCCH at both-end sRBs of each sRBG for sRBG indices 0, 1, and 2, and arranging the sPDCCH equidistantly at a middle sRB.

Hereinafter, a resource assignment method of a short resource block sub-group (sRBSG) in a sRBG is described by further dividing a scheduling unit.

The sRBSG is used to multiplex a UE to which a specific sRBG is assigned in the sRBG. If there are $M_{sRBG}$ sRBSGs in the sRBG, up to $M_{sRBG}$ UEs may be multiplexed. In order to multiplex the UE in the sRBG, assignment information for the sRBSG must be transmitted for up to $M_{sRBG}$ UEs through the sPDCCH. The assignment information for the sRBSG in the sRBG is configured as a UE-ID in a group for the $M_{sRBG}$ UEs and resource assignment information for the sRBSG. Among them, a method of expressing $M_{sRBG}$ UE-IDs in the sRBG may be classified as follows.

UE-ID assignment method based on a bitmap: When the number of UEs in a sRBG is K, K bits are used in total to indicate whether a resource assignment control signal for a corresponding UE is transmitted. If a $K^{th}$ bit is 1 among the K bits, it means that a control signal is transmitted to a UE having a $k^{th}$ UE-ID in a group. On the contrary, a bit expressed as 0 means that the control signal is not transmitted. In this case, among the K bits, the number of '1's cannot be greater than $M_{sRBG}$. This is because $M_{sRBG}$ is a maximum number.

Method of directly indicating a UE-ID: If the number of UEs in a sRBG is K, $M_{sRBG} \times [\log_2(K+1)]$ bits are used in total to indicate a UE-ID. This is a method of indicating which UE is assigned to $M_{sRBG}$ sRBSGs in total, and $[\log_2(K+1)]$ bits are required per sRBSG to express a case where the UE is not assigned to the sRBSG.

The present specification proposes to use a method of having a minimum bit between the aforementioned two methods as a method of expressing a UE-ID to minimize a control signal of a sPDCCH. That is, the number of bits required to express $M_{sRBG}$ UE-IDs in the sPDCCH is min(K, $M_{sRBG} \times [\log_2(K+1)]$). If the UE knows values K and N in advance, the two values may be used to know which method is used to express the UE-ID in the sPDCCH.

Among assignment information for the sRBSG in the sRBG, the resource assignment information for the sRBSG for each UE may use two methods. $M_{sRBG}$ bits are required per UE in case of using a direct bitmap method. $[\log_2(M_{sRBG}(M_{sRBG}+1))]$ bits are required per UE in case of using a contiguous allocation method. Therefore, if there are $M_{sRBG}$ sRBSGs, the total number of bits required for resource assignment is $M_{sRBG}^2$ (i.e., $M_{sRBG} \times M_{sRBG}$) in case of using the direct bitmap method and is $M_{sRBG} \times [\log_2 (M_{sRBG}(M-$ $_{sRBG}+1))]$ in case of using the contiguous allocation method. In case of $M_{sRBG}=1$, since the sRBSG that can be transmitted is designated when the UE-ID is designated, it is possible to omit a bit for resource assignment.

The number of sRBSGs in the sRBG may be determined by the number of UEs intending to transmit a signal in the sRBG, the minimum number of REs expected to be required to transmit data, and the number of REs that can be used by a control signal for transmitting sRBSG resource assignment information. For example, if the sRBG is 4 RBs, the number of REs that can be used by the control signal is 32, and thus only up to 5 control bits can be transmitted when applying a ⅓ channel code and a QPSK modulation. Therefore, if the sRBG has a size of 4 RBs, the number of sRBSGs is preferably maintained to 1.

The number of sRBSGs in the sRBG may be designated for each sRBG through higher layer signaling or sTTI common control signal. However, since the size of the sRBG may dynamically change every sTTI, in this case, it must be designated such that the size of the sRBSG changes in association with the size of the sRBG. For example, although the size of the sRBSG is designated as 8 RBs, if the sRBG is designated as 4 RBs, the size of the sRBSG is preferably designed to be changed to 4 RBs. Specifically, the following scheme may be applied.

Herein, the number of sRBs in the sRBG is $N_{sRBG}$, and the number of sRBs in the sRBSG reported through signaling is $N_{sRBSG}^{temp}$. In this case, the number of sRBs in the sRBSG applied in practice is determined according to the value $N_{sRBG}$ as follows.

If $N_{sRBG} < N_{sRBSG}^{temp}$, $N_{sRBSG} = N_{sRBG}$.
If $N_{sRBG} \geq N_{sRBSG}^{temp}$, the number of sRBs of $$\left[\frac{N_{sRBG}}{N_{sRBSG}}\right]$$

sRBSGs is $$N_{sRBSG} = N_{sRBSG}^{temp}, \text{ and if } \left[\frac{N_{sRBG}}{N_{sRBSG}}\right] < \frac{N_{sRBG}}{N_{sRBSG}},$$

the number of sRBs of the last sRBSG is $$N_{sRBSG} = N_{sRBG} - \left[\frac{N_{sRBG}}{N_{sRBSG}}\right] N_{sRBSG}^{temp}.$$

In this case, the number of sRBSGs in the sRBG is $$N = \left[\frac{N_{sRBG}}{N_{sRBSG}}\right].$$

Although the number of sRBSGs in the sRBG may be expressed through a change in a length of sPDCCH or CRC, in this case, there is a disadvantage in that more CRC resources are used or the number of blind decoding attempts is increased.

Hereinafter, a mapping method between a downlink sRBG and an uplink sRBG is described.

Herein, a method of receiving scheduling information in a single uplink sRBG through a sPDCCH of a single downlink sRBG is proposed. Therefore, if a UE detects a sPDCCH containing a control signal for its uplink transmission in a specific downlink sRBG, the UE needs to recognize a position (or index) of an uplink sRBG used by the UE in an uplink. That is, which uplink sRBSG in an uplink sRBG is assigned is reported in a sPDCCH in a downlink sRBG. Although the position of the uplink sRBG can be implicitly reported on the sPDCCH, the present specification describes a mapping method of an uplink sRBG based on a downlink sRBG to decrease an overhead of a control signal.

It is assumed that the number of sRBs to which a downlink sTTI is applied is $N^{DL}$, and the number of sRBs to which an uplink sTTI is applied is $N^{UL}$. In addition, it is assumed that a downlink sRB logical index to which a sTTI is applied is $n^{DL}$, and an uplink sRB logical index is $n^{UL}$. Herein, $n^{DL}=0, 1, \ldots, N^{DL}-1$, and $n^{UL}=0, 1, \ldots, N^{UL}-1$. The following rule must be abided by when mapping is achieved between a downlink sRBG and an uplink sRBG.

(1) The number of downlink sRBGs must be greater than or equal to the number of uplink sRBGs.

In order to transmit scheduling information for the uplink sRBG, a downlink sRBG for transmitting this is necessarily required. Since there is a case where only a DL grant is transmitted through the downlink sRBG and a UL grant is not transmitted, the number of downlink sRBGs may be greater than the number of uplink sRBGs.

(2) The number of sRBSGs in an uplink sRBG mapped to a specific downlink sRBG must satisfy the following condition.

The number of UL_resource assignment_bits≤(the number of sRBs in DL_sRBG×the minimum number of REs in sRB×3/2)−16−the number of DL_grant bits−UL_NDI When a UE-ID in a group is expressed by using a bitmap format in a UL grant and resource assignment also utilizes the bitmap format, the number $M_{sRBG}^{UL}$ of subgroups in an uplink sRBG is as follows: $M_{sRBG} \leq \sqrt{\text{thenumberofULreousrceassignmentbits} - K}$ The present specification proposes two types of mapping methods between a downlink sRBG and an uplink sRBG. First, there is a method of equally maintaining the number of downlink sRBGs and the number of uplink sRBGs (method 1). This is a method of equally maintaining a ratio between the number $N_{sRBG,i}^{DL}$ of sRBs in an $i^{th}$ sRBG of a downlink and $N^{DL}$ and a ratio between the number $N_{sRBG,i}^{UL}$ of sRBs in an $i^{th}$ sRBG of an uplink and $N^{UL}$. Secondly, there is a method of matching the number of sRBs in a downlink sRBG and the number of sRBs in an uplink sRBG (method 2). This is a method of matching the number of sRBs in an $i^{th}$ sRBG in a downlink and the number of sRBs in an $i^{th}$ sRBG of an uplink.

The number of downlink sRBGs is denoted by $L^{DL}$, and the number of uplink sRBGs is denoted by $L^{UL}$. In addition, a start sRB index of an $i^{th}$ sRBG of a downlink is denoted by $s_{sRBG,i}^{DL}$, and the number of sRBs in an $i^{th}$ sRBG of a downlink is denoted by $N_{sRBG,i}^{DL}$. In addition, a start sRB index of an $i^{th}$ sRBG of an uplink is denoted by $s_{sRBG,i}^{UL}$, and the number of sRBs in an $i^{th}$ sRBG of a downlink is denoted by $N_{sRBG,i}^{UL}$. Herein, $\Sigma_{i=0}^{L^{DL}} N_{sRBG,i}^{DL} = N^{DL}$, $\Sigma_{i=0}^{L^{UL}} N_{sRBG,i}^{UL} = N^{UL}$, $s_{sRBG,i}^{DL} \in \{0,1,\ldots,N^{DL}\}$, $s_{sRBG,i}^{UL} \in \{0, 1, \ldots, N^{UL}\}$. In addition, it is assumed that each UE knows $N^{DL}$, $N^{UL}$, and a start point of a sTTI band of a downlink and an uplink. Hereinafter, an example of the method 1 and the method 2 is described in detail.

Method 1: Method of constantly maintaining the number of downlink sRBGs and the number of uplink sRBGs ($L^{DL}=L^{UL}$).

Since a greater amount of control information can be transmitted in proportion to an increase in a size of the downlink sRBG, the uplink sRBG is allowed to change in size linearly according to the size of the downlink sRBG.

If there is no limitation in a minimum size of the uplink sRBG, the start point of the uplink sRBG is $s_{sRBG,i}^{UL} = [(N^{UL} s_{sRBG,i}^{DL})/N^{DL}]$, and the number of sRBs in the uplink sRBG is $N_{sRBG,i}^{UL} = [(N^{UL} N_{sRBG,i}^{DL})/N^{DL}]$.

The number of sRBs in a last uplink sRBG mapped to a last downlink sRBG is $N^{UL} = N^{UL} - s_{sRBG,i}^{UL}$.

Figure 11:
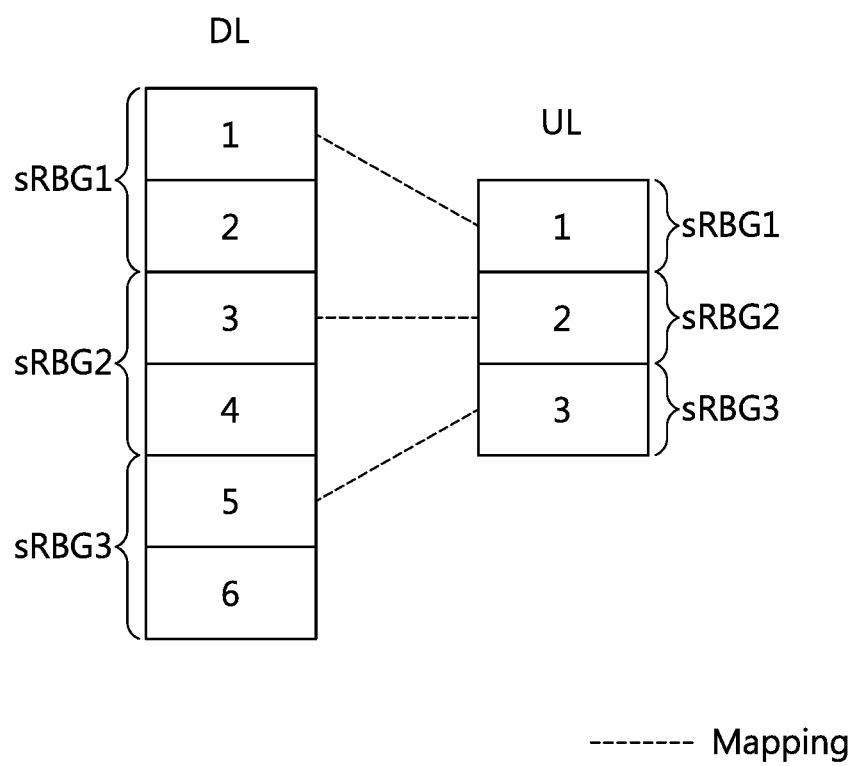
FIG. 11 shows an example of a method of constantly maintaining the number of downlink sRBGs and the number of uplink sRBGs.
Figure 12:
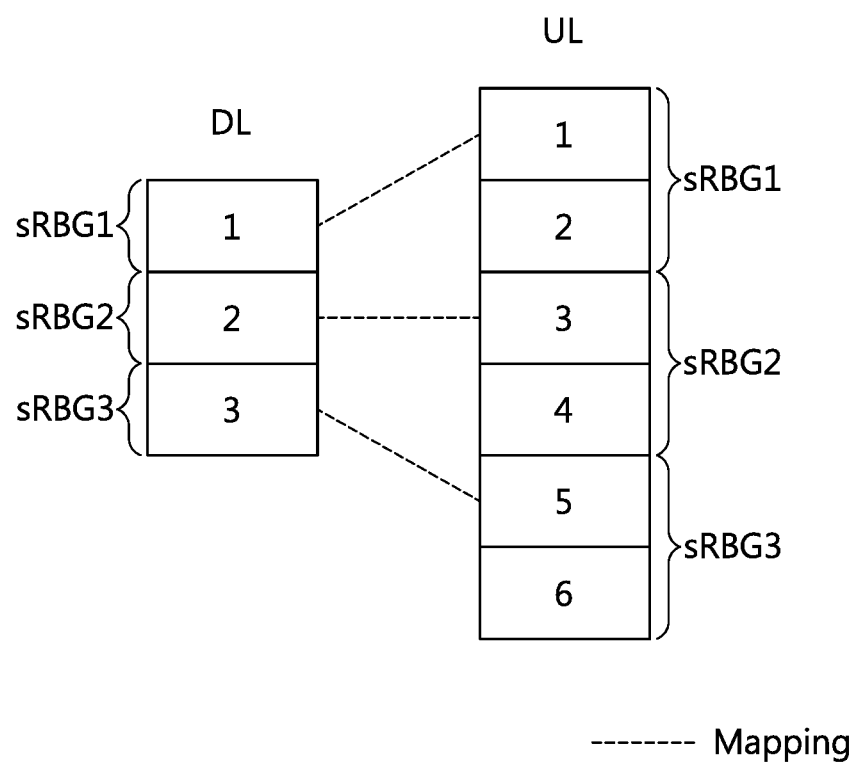
FIG. 12 shows an example of a method of constantly maintaining the number of downlink sRBGs and the number of uplink sRBGs.

FIG. 11 and FIG. 12 show an example of a method of constantly maintaining the number of downlink sRBGs and the number of uplink sRBGs. FIG. 11 is a case where a downlink frequency band to which a sTTI is applied is greater than an uplink frequency band, and FIG. 12 is a case where an uplink frequency band to which a sTTI is applied is greater than a downlink frequency band. An index of 1, 2, 3, . . . of FIG. 11 and FIG. 12 may be an index of a sRB in a downlink/uplink frequency band or an index of a sRBSG. Herein, the index of the sRB is assumed in the following description.

FIG. 11 shows an example of a case where 6 sRBs are present in a downlink frequency band and 3 sRBs are present in an uplink frequency band. The 6 sRBs in the downlink frequency band are grouped in pairs to set sRBG1, sRBG2, and sRBG3. In this case, a ratio of the number of sRBs in a downlink sRBG and the number of sRBs in an uplink sRBG is set so that the number of uplink sRBGs is equal to the number of downlink sRBGs. For the 3 sRBs in the uplink frequency band, the ratio must be 2:1 when it is intended to set the same number of sRBG1s, sRBG2s, and sRBG3s. According to the ratio, the sRBG1 of the downlink frequency band is mapped to the sRBG1 of the uplink frequency band, the sRBG2 of the downlink frequency band is mapped to the sRBG2 of the uplink frequency band, and the sRBG3 of the downlink frequency band is mapped to the sRBG3 of the uplink frequency band. In addition, a start sRB index of an uplink sRBG is mapped to a start sRB index of the mapped downlink sRBG. That is, a start sRB index 1 of the sRBG1 in an uplink is mapped to a start sRB index 1 of the sRBG1 in a downlink, a start sRB index 2 of the sRBG2 in the uplink is mapped to a start sRB index 3 of the sRBG2 in the downlink, and a start sRB index 3 of the sRBG3 in the uplink is mapped to a start sRB index 5 of the sRBG3 in the downlink.

FIG. 12 shows an example of a case where 3 sRBs are present in a downlink frequency band, and 6 sRBs are present in an uplink frequency band. The 3 sRBs in the downlink frequency band are grouped one by one to set sRBG1, sRBG2, and sRBG3. In this case, a ratio of the number of sRBs in a downlink sRBG and the number of sRBs in an uplink sRBG is set so that the number of uplink sRBGs is equal to the number of downlink sRBGs. For the 6 sRBs in the uplink frequency band, the ratio must be 1:2 when it is intended to set the same number of sRBG1s, sRBG2s, and sRBG3s. According to the ratio, the sRBG1 of the downlink frequency band is mapped to the sRBG1 of the uplink frequency band, the sRBG2 of the downlink frequency band is mapped to the sRBG2 of the uplink frequency band, and the sRBG3 of the downlink frequency band is mapped to the sRBG3 of the uplink frequency band. In addition, a start sRB index of an uplink sRBG is mapped to a start sRB index of the mapped downlink sRBG. That is, a start sRB index 1 of the sRBG1 in an uplink is mapped to a start sRB index 1 of the sRBG1 in a downlink, a start sRB index 3 of the sRBG2 in the uplink is mapped to a start sRB index 2 of the sRBG2 in the downlink, and a start sRB index 5 of the sRBG3 in the uplink is mapped to a start sRB index 3 of the sRBG3 in the downlink.

Method 2: Method of matching the number of sRBs in a downlink sRBG and the number of sRBs in an uplink sRBG ($N_{sRBG,i}^{DL} = N_{sRBG,i}^{UL}$)

The sRBG is sorted in a descending order according to the number of sRBs in the downlink sRBGs ($N_{sRBG,i}^{DL} \geq N_{sRBG,i}^{DL} - 1$). In this case, an uplink sRBG is preferentially mapped to a downlink sRBG having a great size. This is because a region in which a control signal can be transmitted is increased when a size of the downlink sRBG is great.

If $s_{sRBG,i}^{DL} < N^{UL}$, the number of sRBs in an $i^{th}$ sRBG of a downlink is matched to the number of sRBs in an $i^{th}$ sRBG of an uplink. In this case, a start point of the $i^{th}$ sRBG of the uplink is $s_{sRBG,i}^{UL} = s_{sRBG,i}^{DL}$, and the number of sRBs in the $i^{th}$ sRBG of the uplink is $N_{sRBG,i}^{UL} = \min(N_{sRBG,i}^{DL}, N^{UL} - s_{sRBG,i}^{DL})$.

If $s_{sRBG,i}^{DL} > N^{UL}$, there is no uplink sRBG corresponding to the $i^{th}$ sRBG of the downlink.

Figure 13:
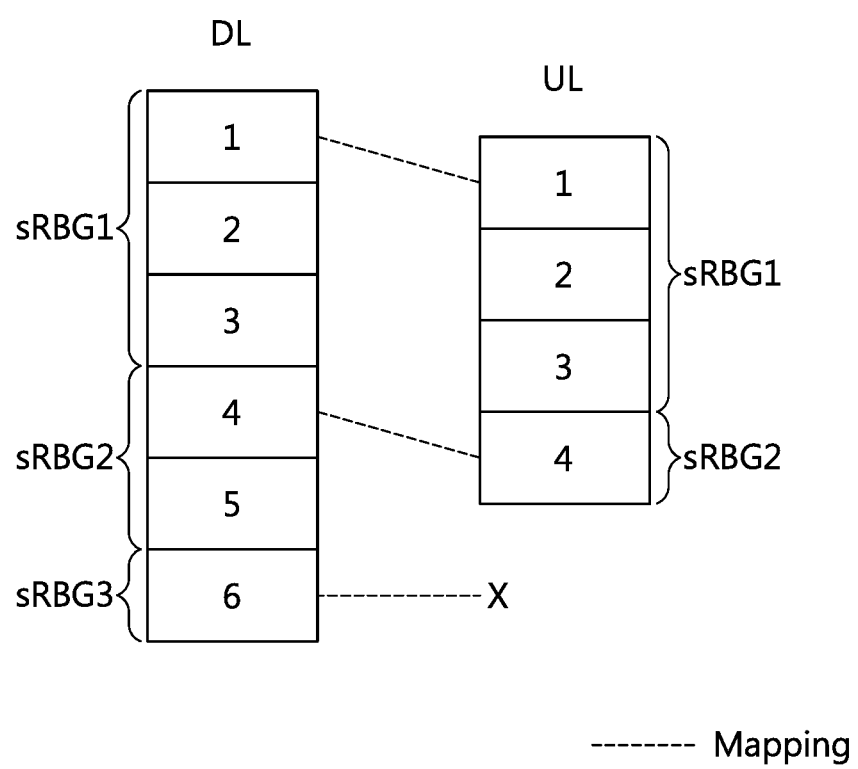
FIG. 13 shows an example of a method of matching the number of sRBs in a downlink sRBG and the number of sRBs in an uplink sRBG.

FIG. 13 shows an example of a method of matching the number of sRBs in a downlink sRBG and the number of sRBs in an uplink sRBG.

FIG. 13 is a case where a downlink frequency band to which a sTTI is applied is greater than an uplink frequency band. An index of 1, 2, 3, . . . of FIG. 13 may be an index of a sRB in a downlink/uplink frequency band or an index of a sRBSG. Herein, the index of the sRB is assumed in the following description.

FIG. 13 shows an example of a case where 6 sRBs are present in a downlink frequency band and 4 sRBs are present in an uplink frequency band. Downlink sRBGs are grouped in a descending order according to the number of sRBs in each sRBG. Therefore, among the 6 sRBs in the downlink frequency band, 3 sRBs are grouped to set sRBG1, two sRBs are grouped to set sRBG2, and the remaining one sRB is grouped to set sRBG3.

In this case, since the number of sRBs in the uplink sRBG must be set to be equal to the number of sRBs in the downlink sRBG, 3 sRBs out of 4 sRBs in the uplink frequency band are grouped to set the sRBG1, and the remaining one sRB is grouped to set the sRBG2. Herein, however, since the sRB in the uplink frequency band is insufficient, it can be seen that the number of sRBs in a $2^{nd}$ sRBG (i.e., sRBG2) of an uplink is not equal to the number of sRBs in a $2^{nd}$ sRBG (i.e., sRBG2) of a downlink. Therefore, since there is a case where the number of sRBs in an $i^{th}$ sRBG of the uplink is not equal to the number of sRBs in an $i^{th}$ sRBG in the downlink, the aforementioned equation $N_{sRBG,i}^{UL} = \min(N_{sRBG,i}^{DL}, N^{UL} - s_{sRBG,i}^{DL})$ is applied. In addition, the sRBG3 cannot be generated since the sRB does no longer exist in the uplink frequency band.

That is, an uplink sRBG having the same number of sRBs in the sRBG is mapped preferentially to a downlink sRBG having a greatest size, and an uplink sRBG of which the number of sRBs in the sRBG is identical or is not identical to a sRBG having a second greatest size. If the uplink sRBG of which the sRB in the sRBG is not identical is mapped to the sRBG having the second greatest size, there is no uplink sRBG to be mapped to a downlink sRBG having a third greatest size.

That is, sRBG1 of a downlink frequency band is mapped to sRBG1 of an uplink frequency band, and sRBG2 of the downlink frequency band is mapped to sRBG2 of the uplink frequency band. However, sRBG3 of the downlink frequency band cannot be mapped to any uplink sRBG since a start sRB index of the sRBG3 is greater than the total number of sRBs of the uplink frequency band ($s_{sRBG,i}^{DL} > N^{UL}$).

In addition, a start sRB index of an uplink sRBG is mapped to a start sRB index of the mapped downlink sRBG. That is, a start sRB index 1 of sRBG1 in an uplink is mapped to a start sRB index 1 of sRBG1 in a downlink, and a start sRB index 4 of sRBG2 in the uplink is mapped to a start sRB index 4 of sRBG2 in the downlink.

The method 1 is easily applied to a case where there is no limitation in a minimum size of an uplink sRBG, whereas the method 2 is easily applied to a case where the minimum size of the uplink sRBG is equal to a minimum size of a downlink sRBG. That is, the method 1 is advantageously applicable to a case where an uplink frequency band to which a sTTI is applied is greater than a downlink frequency band. However, if the uplink frequency band to which the sTTI is applied is less than the downlink frequency band, an uplink scheduling unit is decreased to 1 sRB unit, which leads to a disadvantage in that an overhead of a control signal is increased. The method 2 has an advantage in that an overhead of a control signal of a downlink sRBG having a small size is decreased. However, it cannot be applied to a case where the uplink frequency band is greater than the downlink frequency band. Therefore, the present specification proposes to apply the method 2 when the downlink frequency band to which the sTTI is applied is greater than or equal to the uplink frequency band and to apply the method 1 when the downlink frequency band to which the sTTI is applied is less than the uplink frequency band.

Next, a sTTI resource assignment method is described to decrease an overhead of a control signal by minimizing a change in an MCS level according to resource assignment in a sTTI.

Figure 14:
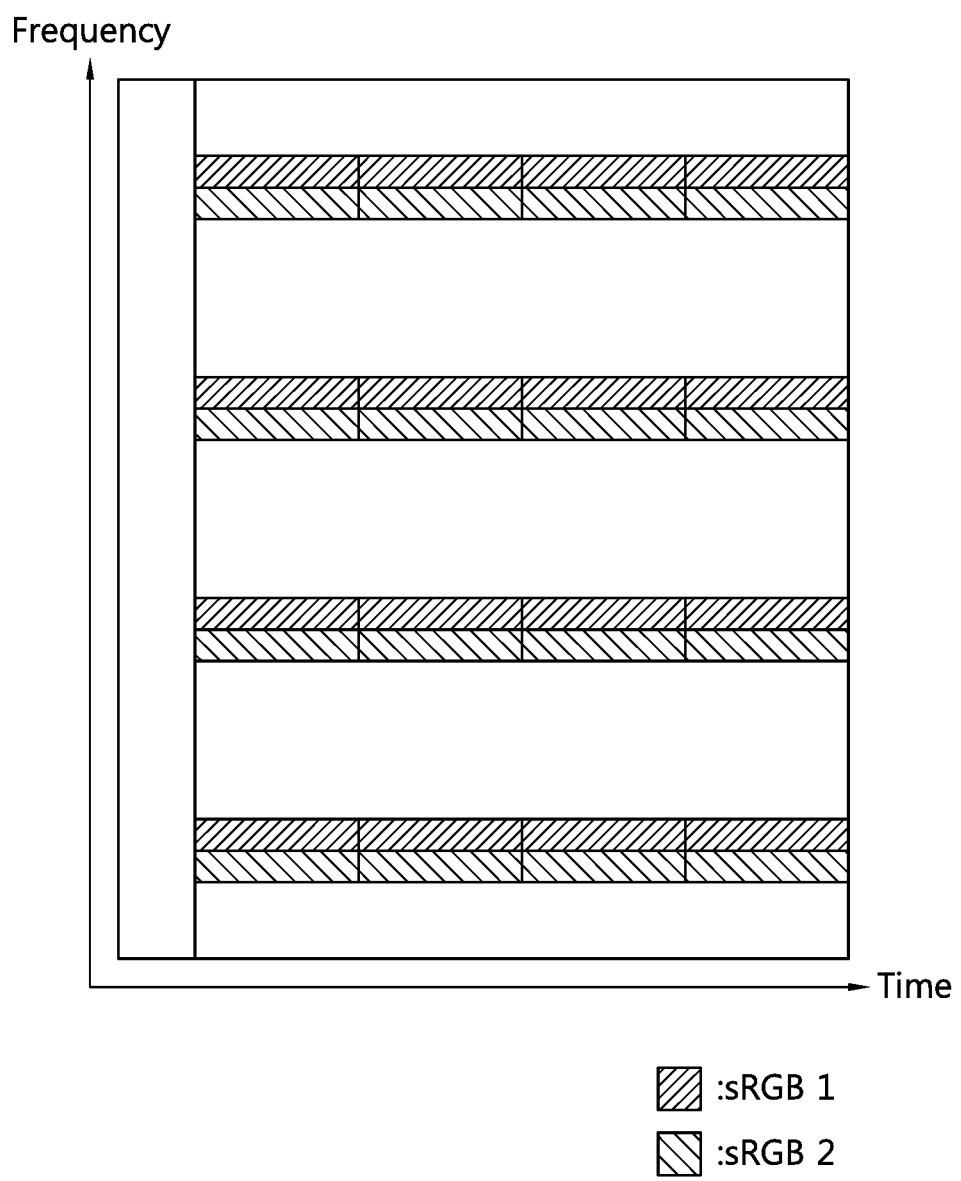
FIG. 14 shows an example of a method of arranging a downlink sRBG in a distributed manner.

FIG. 14 shows an example of a method of arranging a downlink sRBG in a distributed manner.

A method of transmitting MCS information to a common control channel of sTTIs may be considered to decrease an MCS information bit in a sPDCCH. However, in case of applying this method, disadvantageously, it is difficult to express a change in an MCS level based on a position of a sRB assigned in the sTTI. To solve this, a method of widely distributing sRBGs to a system band is proposed when a downlink control signal is transmitted during a sTTI as shown in FIG. 14. In addition, in particular, different sRBGs are arranged adjacently to minimize a channel change between the sRBGs. Therefore, the channel change can be minimized by decreasing an MCS update period.

The method of arranging the sRBG is divided into a step of designating a sub-band to which a sTTI is applied and in which the sRBG can be arranged and a step of designating a position of each sRBG among sub-bands to which the sTTI is applied. The number of sRBs in the sub-band to which the sTTI is applied is preferably a multiple of the sRBG. A minimum unit of the sub-band to which the sTTI is applied may be a minimum unit of the sRBG. The number of sRBs of a sRB in a minimum sRBG is denoted by $N_{sRBG}^{min}$, the number of sRBs to which the sTTI is applied is denoted by $N_{sTTI} = K \cdot N_{sRBG}^{min}$, and the number of RBs in an overall system band is denoted by $N_{BW}$. It is assumed herein that K is any integer number, and the RB and the sRB have the same number of subcarriers. In this case, K sRBs to which the sTTI is applied are consecutively assigned, and $N_{sRBG}^{min}$ sRBs consecutively assigned are grouped in total. FIG. 14 shows an example when K=2 and $N_{sRBG}^{min}=4$. An interval between start points of each sRB group is $$\left\lfloor \frac{N_{BW}}{N_{sRBG}^{min}} \right\rfloor - 1.$$

Therefore, when a first index of the sRB to which the sTTI is applied is $I_{start}$, an index $I_m$ of the sRB to which the sTTI is applied is as follows.

$$I_m = I_{start} + k + n\left\lfloor \frac{N_{BW}}{N_{sRBG}^{min}} \right\rfloor \quad \text{[Equation 1]}$$

Herein, k=0, 1, . . . , K−1 and n=0,1, . . . , $N_{sRBG}^{min}-1$. However, a method of arranging resources as shown in Equation 1 has a disadvantage in that an interval between sRBGs cannot be generated when $$\left\lfloor \frac{N_{BW}}{N_{sRBG}^{min}} \right\rfloor$$

is 1. For example, if $N_{sRBG}^{min}=4$ and $N_{BW}=6$, all sRBs to which the sTTI is applied are arranged consecutively. To overcome such a problem, the sRBs may be arranged by designating a last index $I_{end}$ together with a first index of the sRB to which the sTTI is applied. That is, the index $I_m$ of the sRB to which the sTTI is applied is as follows.

[Equation 2]

$$I_m = \begin{cases} I_{start} + k + n\left\lfloor \frac{N_{BW}}{N_{sRBG}^{min}} \right\rfloor, & \text{if } n = 0, 1, \ldots, \left\lfloor \frac{N_{sRBG}^{min}}{2} \right\rfloor \\ I_{end} - k - (N_{sRBG}^{min} - 1 - n)\left\lfloor \frac{N_{BW}}{N_{sRBG}^{min}} \right\rfloor, & \text{if } n = \left\lfloor \frac{N_{sRBG}^{min}}{2} \right\rfloor + 1, \ldots, N_{sRBG}^{min} - 1 \end{cases}$$

In order for the UE to recognize a position of the sRB to which the sTTI is applied through Equation 1 and Equation 2, $I_{start}$, K, $N_{sRBG}^{min}$, $N_{BW}$ and, if necessary, $I_{end}$ must be known. Herein, $N_{BW}$ is a value known to the UE, and $N_{sRBG}^{min}$ may be reported through higher layer signaling. Therefore, in case of applying Equation 1, $I_{start}$ and K may be reported through a sTTI common control signal or the higher layer signaling, so that low-latency UEs can recognize a position of each sRBG and the RB to which the sTTI is applied. In case of applying Equation 2, $I_{end}$ is additionally reported.

Although the sRBG may be arranged in a downlink in a distributed manner as described above, it may be difficult to arrange resources in an uplink in a distributed manner. This means that a change in an MCS level based on resource arrangement in the uplink is greater than in the downlink. Therefore, it is necessary to preferentially arrange the MCS level in the uplink rather than in the downlink when sPDCCH transmission is performed on limited resources.

Next, a method of decreasing a retransmission control signal through a synchronous downlink retransmission scheme is described.

In downlink retransmission of an LTE system, a process ID, redundancy version (RV), and new data indicator (NDI) of a retransmission process are transmitted whenever retransmission is performed using an asynchronous retransmission scheme. The present specification proposes to use a synchronous retransmission scheme in a downlink to decrease a control signal of a short DL (sDL) grant. When the synchronous retransmission scheme is applied in the downlink, the process ID may be omitted in the sDL grant, and an RV of a retransmission signal may be configured in advance to vary depending on a specific sequence.

sRB assignment information which is resource assignment information is transmitted in the sDL grant, and the MCS level may be transmitted through a common physical control channel. Therefore, although it is synchronization retransmission, it is possible to perform retransmission adaptively. Accordingly, a change type of an RV is designated in advance according to the MCS level and the number of sRBs assigned for any retransmission process. This needs to be shared by a UE and a BS.

It is assumed that a coding rate of a mother code used in a communication system is r. In addition, an information bit before encoding is $b_k$, k=1, 2, ..., K, and a parity bit of a mother code generated after encoding is $P_n$, n=1, 2, ..., N. Herein, it is assumed that r=K/(K+N) and $P_n$ is rearranged sequentially to obtain a higher coding rate than the mother code through puncturing.

The present specification considers a scheme of sequentially transmitting $P_n$ if a parity bit can be transmitted after preferentially transmitting an information bit according to a size of a transport block in every transmission. In addition, it is proposed a scheme in which, if each of all parity bits is transmitted one time before reaching the maximum number of retransmission attempts, a start point of a parity bit is randomly set in subsequent retransmission, and the parity bits are sequentially transmitted after any value. That is, $P_n$, n=1, 2, ..., N is sequentially transmitted before all parity bits of the mother code are transmitted. After $P_n$ is completely transmitted, a start point is randomly set to j, and thereafter transmission is performed in the order of $P_j$, $P_{j+1}$, ..., $P_N$, P1, $P_2$, ..., $P_{j-1}$. In addition, after N parity bits are completely transmitted again, the value j is randomly set again and thereafter the same scheme is performed. Alternatively, there may be a scheme in which, if each of all parity bits is transmitted one time before reaching the maximum number of retransmission attempts, the parity bits are randomly rearranged in subsequent retransmission and thereafter the parity bits are sequentially transmitted. That is, $f(P_1, P_2, ..., P_N)=(P_1', P_2', ..., P_N')$ is generated through random rearrangement, and thereafter $P_n'$ is sequentially transmitted.

The aforementioned two schemes have an advantage in that an impaired parity bit can be rapidly restored through randomization of parity duplication transmission when a specific parity bit is impaired due to a poor channel characteristic. In the first scheme, a sequence for a start point of the parity bit may be delivered in advance from the BS to the UE through higher layer signaling. In the second scheme, an index of a function used to rearrange the parity bit may be delivered through higher layer signaling. Herein, it is assumed that functions (scramblers) used to rearrange the parity bit are shared in advance. In addition, although the aforementioned scheme is described through a downlink, it is also applicable equally to an uplink.

Next, an embodiment of configuring information of a sPDCCH to which the aforementioned schemes are applied is described. Herein, it is assumed that an assignment resource of a sRBG and a size of a sRBSG are known through higher layer signaling or a common control channel of a sTTI or blind decoding performed at a sPDCCH assignment location or the like.

Hereinafter, an embodiment for configuring information of a sPDCCH is described when both an uplink frequency band and downlink frequency band to which a sTTI is applied have 4 RBs.

Herein, it is assumed a case where the number of UEs in a UE group is 8 (K=8), the number of downlink UE groups is 8 (M=8), and the number of uplink UE groups is 1 (N=1). In this case, since the number of downlink UEs is equal to the number of low-latency UEs that can be assigned to a downlink sRBG, the number of UEs for each downlink UE group is 1 (|Dm|=1, m=1, 2, ..., 8). In addition, since the number of uplink UE groups is 1, the number of UEs in the uplink UE group is 8 (|U$_1$|=8). Herein, a size of a downlink sRBG is 4 RBs, and a size of an uplink sRBG is 4 RBs. A downlink sRBSG and an uplink sRBSG also have a size of 4 RBs. That is, since the number of sRBSGs that can be scheduled is one in each of an uplink and a downlink, it is enough to transmit one DL grant and one UL grant in the sPDCCH. The total number of cell-radio network temporary identifiers (C-RNTIs) used for sPDCCH transmission in the sRBG is 17 (it may be obtained by (M+1)×(N+1)−1). The number of sPDCCH bits required for this is as shown in the following table.

TABLE 2

| configuration information in sPDCCH | the required number of bits |
|---|---|
| UE-ID information assigned to downlink sRBSG | 0 bit (UE can be identified with C-RNTI) |
| downlink sRBSG assignment | 0 bit (since there is only one sRBSG to which resources can be assigned, a bit for designating this is unnecessary) |
| UE-ID information assigned to uplink sRBSG | 3 bits |
| uplink sRBSG assignment | 0 bit |
| MCS | 0 bit (it is transmitted through sTTI common physical control) |
| downlink retransmission process | 1 bit (NDI) |
| uplink retransmission process | 1 bit (NDI) |
| uplink power control | 0 bit (it is transmitted through sTTI common physical control channel) |
| CRC | 16 bits |
| the total number of bits | 21 bits |
| the number of required REs | 32 REs |

According to min(K, $M_{sRBG}$×[log$_2$(K+1)]) which is an equation for the number of bits required to express $M_{sRBG}$ UE-IDs in the aforementioned sPDCCH, 4 bits are required to express a UE-ID of a UE assigned to an uplink sRBSG. However, according to a method of mapping a downlink sRBG and an uplink sRBG to a common C-RNTI, the C-RNTI may also be used for identification in a case where there is a UE scheduled with a downlink but there is no UE scheduled with an uplink. Therefore, only 3 bits are required to express the UE-ID of the UE assigned to the uplink sRBSG. That is, it may be expressed with min(K, N×[log$_2$(K)]) bits. However, such a characteristic may be applied when there is only one sRBSG in the sRBG.

According to Table 2, since the total number of bits for sPDCCH transmission is 21 bits, the sPDCCH may be transmitted by using 32 REs in total in case of using a channel coding having a ⅓ coding rate and a QPSK modulation scheme. As described above, when the sRBG consists of 4 RBs, at least 32 REs are present, and thus a control signal may be transmitted in the 32 REs.

If the coding rate is allowed to be more increased to be greater than ⅓, 36 REs as a CCE unit of the existing LTE system may be applied. In this case, the control signal may be transmitted through rate matching in 32 REs not having a CRS instead of transmitting the control signal in a position of the CRS among 36 REs. In this case, although the coding rate is increased to up to ⅜=0.375, the number of bits of the control information that can be transmitted is increased to 8 bits. Since the number of bits of the control information is 5 bits in the aforementioned embodiment, the remaining 3 bits may be utilized. The 3 bits may be utilized to express a greater number of UE-IDs, or to express a downlink or uplink MCS level, or to express an uplink power control.

Hereinafter, an example for configuring information of a sPDCCH is described when a downlink frequency band to which a sTTI is applied has 8 RBs, and an uplink frequency band has 4 RBs.

Herein, it is assumed that the number of UEs in a UE group is 8(K=8), the number of downlink UE groups is 2 (M=2), and the number of uplink UE groups is 2 (N=2). In this case, the number of UEs in the downlink UE group and the number of UE in the uplink UE group are both 4 (|Dm|=|Um|=4, m=1, 2). Only one sRBG may be generated in an uplink. Therefore, an uplink sRBG has a size of 4 RBs. On the other hand, in a downlink, one sRBG consisting of 8 sRBs may be generated, or two sRBGs consisting of 4 sRBs may be generated. If two UEs intending to perform downlink transmission belong to the same downlink UE group, it is preferable to use a sRBG consisting of 8 sRBs in terms of an overhead of the control signal. On the contrary, if the two UEs belong to different downlink UE groups, a sRBG consisting of 4 sRBs are necessarily used. When the two UEs belong to the different downlink UE groups, an information bit of a sPDCCH in each sRBG may be expressed by the following table.

TABLE 3

| configuration information in sPDCCH | the required number of bits |
|---|---|
| UE-ID information assigned to downlink sRBSG | 2 bits |
| downlink sRBSG assignment | 0 bit |
| UE-ID information assigned to uplink sRBSG | 2 bits |
| uplink sRBSG assignment | 0 bit |
| MCS | 0 bit |
| downlink retransmission process | 1 bit (NDI) |
| uplink retransmission process | 1 bit (NDI) |
| uplink power control | 0 bit |
| CRC | 16 bits |
| the total number of bits | 22 bits |
| the number of required REs | 33 REs |

In Table 3, since the total number of bits for sPDCCH transmission is 22 bits, the sPDCCH may be transmitted by using 33 REs in total in case of using a channel coding having a ⅓ coding rate and a QPSK modulation scheme. As described above, when the sRBG consists of 4 RBs, at least 32 REs are present, and thus the sPDCCH is transmitted with a coding rate of 0.34375 by performing rate matching to transmit the sPDCCH.

In addition, if two UEs belong to the same downlink UE group, the sPDCCH may be transmitted by setting the size of the sRBG to 8 RBs. In this case, an information bit of the sPDCCH in the sRBG may be expressed by the following table.

TABLE 4

| configuration information in sPDCCH | the required number of bits |
|---|---|
| UE-ID information assigned to downlink sRBSG | 4 bits (bitmap scheme is applied) |
| downlink sRBSG assignment | 4 bits (Allocation of 2 bits per UE) |
| UE-ID information assigned to uplink sRBSG | 4 bits |
| uplink sRBSG assignment | 0 bit |
| MCS | 0 bit |
| downlink retransmission process | 2 bits (NDI) |
| uplink retransmission process | 1 bit (NDI) |
| uplink power control | 0 bit |
| CRC | 16 bits |
| the total number of bits | 31 bits |
| the number of required REs | 47 REs |

In Table 4, a UE-ID of a UE assigned to a downlink sRBSG is expressed in a bitmap format. Since resources can be assigned to up to two UEs, 2 bits are required for each UE as an assignment bit of a downlink sRBSG. That is, 4 bits are required for the UE-ID of the UE assigned to the downlink sRBSG.

In Table 3, 8 RBs are divided into 2 sRBGs in a downlink, and a control signal is transmitted through 33 REs (32 REs when using rate matching) in each sRBG. Therefore, 66 REs are used for the control signal in 8 RBs in total. However, in Table 4, 8 RBs are used as one sRBG in the downlink, and a control signal is transmitted through 47 REs in the sRBG. By comparing Table 3 and Table 4, it can be seen that the sRBG size is increased (4 RBs->8 RBs), thereby decreasing an overhead of the control signal.

Hereinafter, an embodiment for configuring information of a sPDCCH is described when both an uplink frequency band and downlink frequency band to which a sTTI is applied have 8 RBs.

Herein, it is assumed that the number of UEs in a UE group is 8 (K=8), the number of downlink UE groups is 2 (M=2), and the number of uplink UE groups is 2 (N=2). In this case, the number of UEs in the downlink UE group and the number of UEs in the uplink UE group are both 4 (|Dm|=|Um|=4, m=1, 2). One sRBG consisting of 8 sRB may be generated or two sRBGs consisting of 4 sRBs may be generated in each of an uplink and a downlink. If two UEs intending to transmit a control signal in the downlink belong to the same downlink UE group, it is preferable to use a sRBG consisting of 8 sRBs in terms of an overhead of the control signal. On the other hand, if the two UEs belong to different downlink UE groups, a sRBG consisting of 4 sRBs are necessarily used.

When the two UEs belong to the different downlink UE groups, since a downlink sRBG has a size of one sRBSG, an uplink sRBG also has a size of one sRBSG in consideration of the overhead of the control signal. In this case, as shown in Table 3, since the total number of bits for sPDCCH transmission is 22 bits, the sPDCCH may be transmitted by using 33 REs in total in case of using a channel coding having a ⅓ coding rate and a QPSK modulation scheme. As described above, when the sRBG consists of 4 RBs, at least 32 REs are present, and thus the sPDCCH is transmitted with a coding rate of 0.34375 by performing rate matching to transmit the sPDCCH.

Unlike this, if two UEs belong to the same downlink UE group, the sPDCCH may be transmitted by setting the size of the sRBG to 8 RBs. If 8 RBs constitute one sRBG in an uplink and one sRBG has one sRBSG, an information bit of the sPDCCH may be configured similarly to Table 4. If 8 RBs constitute one sRBG and one sRBG is divided into 2 sRBSGs, the information bit in the sPDCCH may be expressed by the following table.

TABLE 5

| configuration information in sPDCCH | the required number of bits |
|---|---|
| UE-ID information assigned to downlink sRBSG | 4 bits |
| downlink sRBSG assignment | 4 bits (Allocation of 2 bits per UE) |
| UE-ID information assigned to uplink sRBSG | 4 bits |
| uplink sRBSG assignment | 4 bits (Allocation of 2 bits per UE) |
| MCS | 0 bit |
| downlink retransmission process | 2 bits (NDI) |
| uplink retransmission process | 2 bits (NDI) |
| uplink power control | 0 bit |
| CRC | 16 bits |
| the total number of bits | 36 bits |
| the number of required REs | 54 REs |

In addition, it is assumed a case where the number of UEs in a UE group is 8 (K=8), the number of downlink UE groups is 4 (M=4), and the number of uplink UE groups is 4 (N=4). In this case, if control signals are transmitted for two UEs in the same downlink UE group and two UEs in the same uplink UE group, it may be assumed that a sRBG size is 8 RBs in both an uplink and a downlink, and a sRBG has two sRBSGs. In this case, an information bit in a sPDCCH may be expressed by the following table.

TABLE 6

| configuration information in sPDCCH | the required number of bits |
|---|---|
| UE-ID information assigned to downlink sRBSG | 2 bits |
| downlink sRBSG assignment | 4 bits (assignment of 2 bits per UE) |
| UE-ID information assigned o uplink sRBSG | 2 bits |
| uplink sRBSG assignment | 4 bits (assignment of 2 bits per UE) |
| MCS | 0 bit |
| downlink retransmission process | 2 bits (NDI) |
| uplink retransmission process | 2 bits (NDI) |
| uplink power control | 0 bit |
| CRC | 16 bits |
| the total number of bits | 32 bits |
| the number of required REs | 48 REs |

Figure 15:
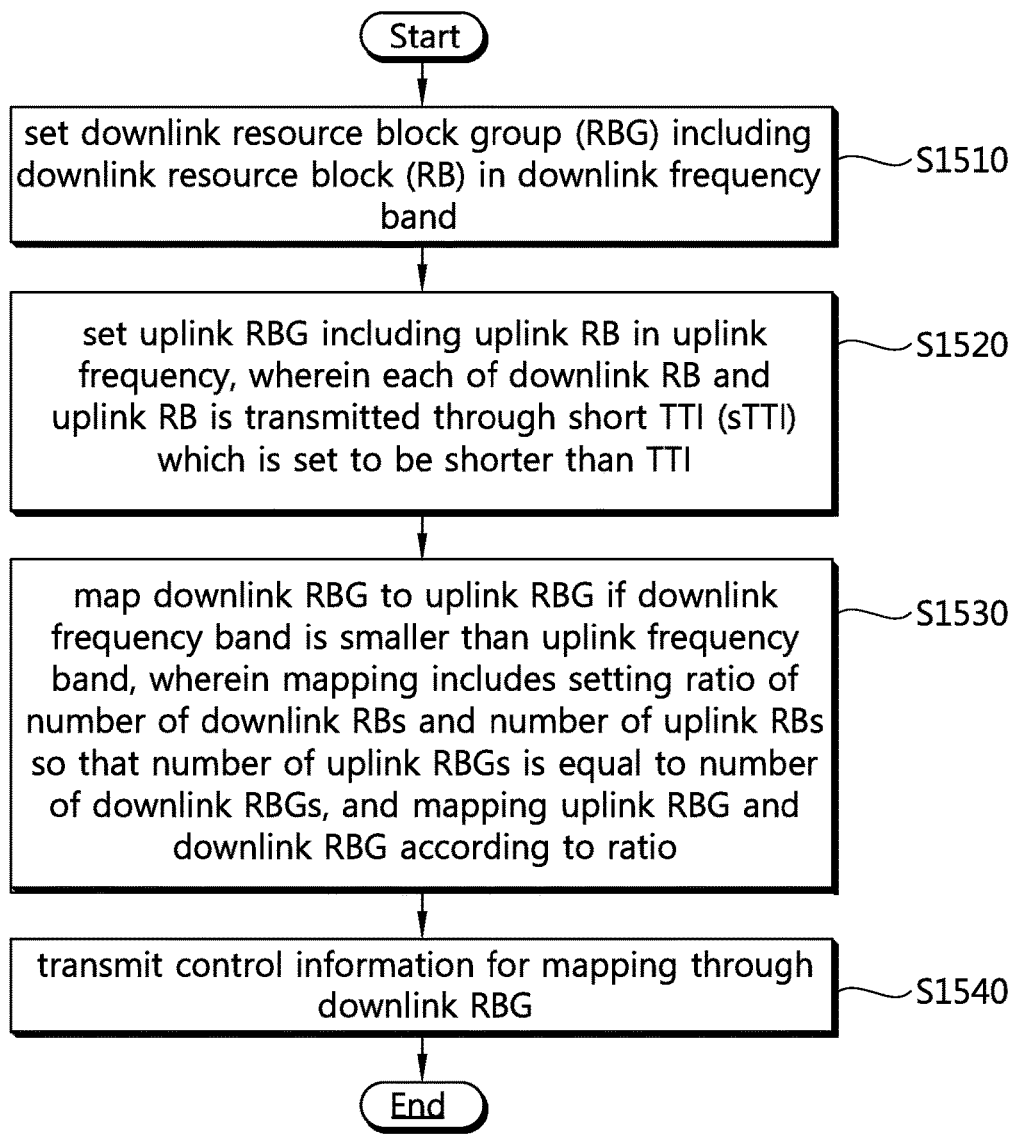
FIG. 15 is a flowchart illustrating a procedure of transmitting control information in a wireless communication system according to an embodiment of the present specification.

FIG. 15 is a flowchart illustrating a procedure of transmitting control information in a wireless communication system according to an embodiment of the present specification.

First, terminologies are summarized. A subframe is transmitted in unit of a transmission time interval (TTI), and a downlink resource block (RB) and an uplink RB are transmitted in unit of a short TTI (sTTI) which is set temporally shorter than the TTI. That is, the downlink RB may be a short RB (sRB), and a downlink resource block group (RBG) may be a downlink short RBG (sRBG). In addition, the uplink RB may be an uplink sRB, and the uplink RBG may be a sRBG.

In step S1510, the downlink RBG including the downlink RB in the downlink frequency band is set. That is, the downlink sRB may be grouped to set the downlink sRBG. In addition, the downlink sRBG may include a downlink sRB sub-group (sRBSG). The downlink sRBSG is used so that UEs to which the same downlink sRBG is assigned are multiplexed in the downlink sRBG.

In step S1520, the uplink RBG including the uplink RB in the uplink frequency band is set. That is, the uplink sRB may be grouped to set the uplink sRBG. In addition, the uplink sRBG may include an uplink sRB sub-group (sRBSG). The uplink sRBSG is used so that UEs to which the same uplink sRBG is assigned are multiplexed in the uplink sRBG.

In step S1530, if the downlink frequency band is smaller than the uplink frequency band, the downlink RBG is mapped to the uplink RBG. When it is said that the downlink frequency band is smaller than the uplink frequency band, it means that the total number of downlink sRBs assigned to the UE is less than the total number of uplink sRBs. Mapping will be described in detail. First, a ratio of the number of uplink RBs and the number of downlink RBs is set so that the number of uplink RBGs is equal to the number of downlink RBGs. The uplink RBG and the downlink RBG are mapped according to the ratio. That is, it is set such that a ratio of the number of sRBs in a specific downlink sRBG and the total number of downlink sRBs is equal to a ratio of the number of sRBs in a specific uplink sRBG to be mapped and the total number of uplink sRBs. Finally, a start RB index of the uplink RBG is mapped to a start RB index of the downlink RBG.

In step S1540, after a previous mapping process in step S1530, control information for the mapping is transmitted through the downlink RB G. The control information for the mapping indicates the uplink RBG mapped to the downlink RBG through information regarding a start RB index of the downlink RBG. That is, the control information for the mapping is not for directly scheduling the uplink RBG with a UL grant included in the control information but for indicating a position of the uplink RBG through the downlink RBG simply through the mapping process. This is because the start RB index of the downlink RBG is mapped to the start RB index of the uplink RBG in step S1530.

Figure 16:
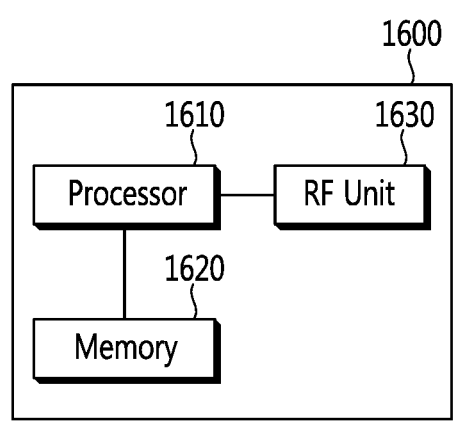
FIG. 16 is a block diagram showing an apparatus for wireless communication for implementing an embodiment of the present invention.

FIG. 16 is a block diagram showing an apparatus for wireless communication for implementing an embodiment of the present invention.

An apparatus 1600 for wireless communication includes a processor 1610, a memory 1620 and a radio frequency (RF) unit 1630.

The processor 1610 may be configured to implement proposed functions, procedures and/or methods described in this description. Layers of the radio interface protocol may be implemented in the processor 1610. The processor 1610 may handle a procedure explained above. The memory 1620 is operatively coupled with the processor 1610, and the RF unit 1630 is operatively coupled with the processor 1610.

The processor 1610 may include application-specific integrated circuit (ASIC), other chipset, logic circuit and/or data processing device. The memory 1620 may include read-only memory (ROM), random access memory (RAM), flash memory, memory card, storage medium and/or other storage device. The RF unit 1630 may include baseband circuitry to process radio frequency signals. When the embodiments are implemented in software, the techniques described herein can be implemented with modules (e.g., procedures, functions, and so on) that perform the functions described herein. The modules can be stored in memory 1620 and executed by processor 1610. The memory 1620 can be implemented within the processor 1610 or external to the processor 1610 in which case those can be communicatively coupled to the processor 1610 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Furthermore, the technical concepts in the described embodiments may be identically applied, and embodiments in which the number of subframes and the number of special symbols within a radio frame are differently defined may be included in the technical scope of this specification.

What is claimed is:

1. A method of transmitting control information in a wireless communication system using a subframe transmitted in unit of a transmission time interval (TTI), the method comprising:
    setting a downlink resource block group (RBG) comprising a downlink resource block (RB) in a downlink frequency band;
    setting an uplink RBG comprising an uplink RB in an uplink frequency, wherein each of the downlink RB and the uplink RB is transmitted through a short TTI (sTTI) which is set to be shorter than the TTI;
    if the downlink frequency band is smaller than the uplink frequency band, mapping the downlink RBG to the uplink RBG, wherein the mapping comprises setting a ratio of the number of downlink RBs and the number of uplink RBs so that the number of uplink RBGs is equal to the number of downlink RBGs, and mapping the uplink RBG and the downlink RBG according to the ratio; and
    transmitting control information for the mapping through the downlink RBG.

2. The method of claim 1, further comprising,
    if the downlink frequency band is greater than or equal to the uplink frequency band, mapping the downlink RBG to the uplink RBG,
    wherein if the downlink frequency band is greater than or equal to the uplink frequency band, the mapping comprises mapping the downlink RBG to the uplink RBG sequentially in a descending order of the number of downlink RBs in the downlink RBG, setting the number of uplink RBs in the uplink RBG first mapped to the downlink RBG to be equal to the number of downlink RBs in the downlink RBG, and mapping a start RB index of the uplink RBG to a start RB index of the downlink RBG.

3. The method of claim 2, wherein if the downlink frequency band is greater than or equal to the uplink frequency band, the mapping comprises setting the number of uplink RBs in the downlink RBG and the uplink RBG mapped next to be less than or equal to the number of downlink RBs in the downlink RBG, and mapping a start RB index of the uplink RBG to a start RB index of the downlink RBG.

4. The method of claim 1,
    wherein a start RB index of the uplink RBG is mapped to a start RB index of the downlink RBG, and
    wherein the control information for the mapping indicates an uplink RBG mapped to the downlink RBG through information regarding the start RB index of the downlink RBG.

5. The method of claim 1, wherein the number of uplink RBs in the uplink RBG varies depending on the number of downlink RBs in the downlink RBG.

6. The method of claim 1, wherein the downlink RBG comprises at least 4 downlink RBs.

7. The method of claim 1, wherein the number of downlink RBs in the downlink RBG is designated by a radio resource control (RRC) or by a common control channel.

8. The method of claim 1, wherein the downlink RBG comprises a downlink resource block sub-group (RBSG), and the number of downlink RBs in the downlink RBSG varies depending on the number of downlink RBs in the downlink RBG.

9. The method of claim 8, wherein the downlink RBG comprises assignment information regarding the downlink RBSG and a UE-identification (ID) indicating a UE for each downlink RBSG.

10. The method of claim 9, wherein the UE-ID is indicated by a smaller number of bits between the number of bits indicated by a bitmap and the number of bits indicated directly.

11. The method of claim 1, wherein the control information for the mapping further comprises one cyclic redundancy checking (CRC) field masked by using a radio network temporary identifier (RNTI) mapped to the downlink RBG and the uplink RBG.

12. A wireless device for transmitting control information in a wireless communication system using a subframe transmitted in unit of a transmission time interval (TTI), comprising:
    a radio frequency (RF) unit that transmits and receives a radio signal; and
    a processor operatively coupled to the RF unit, wherein the processor is configured for:
    setting a downlink resource block group (RBG) comprising a downlink resource block (RB) in a downlink frequency band;
    setting an uplink RBG comprising an uplink RB in an uplink frequency, wherein each of the downlink RB and the uplink RB is transmitted through a short TTI (sTTI) which is set to be shorter than the TTI;
    if the downlink frequency band is smaller than the uplink frequency band, mapping the downlink RBG to the uplink RBG, wherein the mapping comprises setting a ratio of the number of downlink RBs and the number of uplink RBs so that the number of uplink RBGs is equal to the number of downlink RBGs, and mapping the uplink RBG and the downlink RBG according to the ratio; and transmitting control information for the mapping through the downlink RBG.

* * * * *